United States Patent
Hua et al.

(10) Patent No.: US 12,150,120 B2
(45) Date of Patent: Nov. 19, 2024

(54) METHOD AND DEVICE FOR NEW RADIO DATA TRANSMISSION USING SECONDARY RESOURCE

(71) Applicant: Huawei Technologies Co., Ltd., Shenzhen (CN)

(72) Inventors: Meng Hua, Shenzhen (CN); Shurong Jiao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 338 days.

(21) Appl. No.: 17/575,642

(22) Filed: Jan. 14, 2022

(65) Prior Publication Data

US 2022/0141854 A1 May 5, 2022

Related U.S. Application Data

(63) Continuation of application No. PCT/CN2020/099666, filed on Jul. 1, 2020.

(30) Foreign Application Priority Data

Jul. 15, 2019 (CN) .......................... 201910633800.X

(51) Int. Cl.
*H04W 72/1268* (2023.01)
*H04L 5/00* (2006.01)
*H04W 72/542* (2023.01)

(52) U.S. Cl.
CPC ....... *H04W 72/1268* (2013.01); *H04L 5/0005* (2013.01); *H04W 72/542* (2023.01)

(58) Field of Classification Search
USPC ....................................................... 370/330
See application file for complete search history.

(56) References Cited

U.S. PATENT DOCUMENTS 10,277,367 B2 4/2019 Nory et al.
10,609,682 B2 3/2020 Zhang
(Continued)

FOREIGN PATENT DOCUMENTS

CN 108886801 A 11/2018
CN 108923890 A 11/2018
(Continued)

OTHER PUBLICATIONS

"3rd Generation Partnership Project; Technical Specification Group Radio Access Network; NR; Physical layer procedures for data (Release 15)," 3GPP TS 38.214 V1.0.0, Sep. 2017, 32 pages.
(Continued)

*Primary Examiner* — Gary Mui
*Assistant Examiner* — Hooman Houshmand
(74) *Attorney, Agent, or Firm* — SLATER MATSIL, LLP

(57) ABSTRACT

A data transmission method and device, the method including obtaining, by a terminal device, a first resource and a second resource, where at least one first uplink transmission opportunity is configured for the first resource, a second uplink transmission opportunity is configured for the second resource, the first uplink transmission opportunity comprises X repeated first uplink transmission resources, the second uplink transmission opportunity comprises Y repeated second uplink transmission resources, and both X and Y are each integers greater than or equal to 1, and sending, by the terminal device, uplink data to a network device using the second uplink transmission opportunity in response to sending using N closest first uplink transmission opportunities before the second uplink transmission opportunity being blocked, where N is an integer greater than or equal to 1.

20 Claims, 7 Drawing Sheets

(56) References Cited

U.S. PATENT DOCUMENTS

| | | | |
|---|---|---|---|
| 11,641,249 B2* | 5/2023 | Jung | H04L 1/1896 |
| | | | 370/330 |
| 2015/0156763 A1 | 6/2015 | Seo et al. | |
| 2016/0278048 A1* | 9/2016 | Nory | H04W 72/23 |
| 2018/0175973 A1* | 6/2018 | Rosa | H04L 5/0055 |
| 2018/0367282 A1* | 12/2018 | Li | H04W 72/1268 |
| 2019/0059001 A1* | 2/2019 | Yerramalli | H04L 1/0073 |
| 2019/0059093 A1 | 2/2019 | Cheng et al. | |
| 2019/0075581 A1* | 3/2019 | Salem | H04W 16/14 |
| 2020/0213043 A1* | 7/2020 | Hooli | H04W 72/04 |
| 2020/0314658 A1* | 10/2020 | Bergström | H04W 72/21 |
| 2021/0352644 A1* | 11/2021 | Zhou | H04L 1/08 |

FOREIGN PATENT DOCUMENTS

| | | |
|---|---|---|
| CN | 109217981 A | 1/2019 |
| CN | 109496400 A | 3/2019 |
| WO | 2019082156 A1 | 5/2019 |

OTHER PUBLICATIONS

"3rd Generation Partnership Project; Technical Specification Group Radio Access Network; NR; Radio Resource Control (RRC); Protocol specification (Release 15)," 3GPP TS 38.331 V0.1.0, Oct. 2017, 42 pages.

"Discussion on the Wideband Operation for NR-U," Agenda item: 7.2.2.2.5, Source: Xiaomi, Document for: Discussion, 3GPP TSG RAN WG1 #97, R1-1906638, Reno, USA, May 13-17, 2019, 4 pages.

* cited by examiner

METHOD AND DEVICE FOR NEW RADIO DATA TRANSMISSION USING SECONDARY RESOURCE

CROSS-REFERENCE TO RELATED APPLICATIONS

This application is a continuation of International Application No. PCT/CN2020/099666, filed on Jul. 1, 2020, which claims priority to Chinese Patent Application No. 201910633800.X, filed on Jul. 15, 2019. The aforementioned applications are hereby incorporated by reference in their entireties.

TECHNICAL FIELD

Embodiments of this application relate to communication technologies, and in particular, to a data transmission method and a device.

BACKGROUND

A concept of a configured grant (CG) is introduced to a new radio (NR) communication system (NR system). After a network device semi-persistently configures a CG resource for a terminal device, when the terminal device needs to send uplink data, the terminal device may directly send, by using the CG resource, a physical uplink shared channel (PUSCH) that carries the uplink data, and does not need to wait for dynamically scheduling of the PUSCH by the network device. Currently, because the CG resource is a semi-persistent resource separately configured by the network device for the terminal device, the CG resource may conflict with a resource configured by a higher layer of a cell in which the terminal device is located, or conflict with a resource dynamically scheduled by the network device. Consequently, sending of the PUSCH is blocked.

An ultra-reliable and low-latency communications (URLLC) service is an important service in the NR system, and requires quite high reliability and a quite low latency during transmission. When the terminal device sends uplink data of the URLLC service by using the CG resource, if sending of the PUSCH is blocked, a latency of transmitting the URLLC service increases, and a latency requirement of the URLLC service may not be satisfied. In view of the latency requirement of the URLLC service, the following two solutions are proposed in a conventional technology. Solution 1: The network device avoids, as much as possible through scheduling, that sending of the PUSCH is blocked. However, the solution affects scheduling flexibility of the network device. Solution 2: The network device configures a plurality of CG resources for the terminal device. However, when none of the plurality of CG resources encounters a scenario in which sending of the PUSCH is blocked, because the network device does not determine a CG resource, where the terminal device sends the uplink data by using an uplink transmission opportunity of the CG resource, the network device needs to monitor, on the plurality of CG resources, the uplink data from the terminal device. Consequently, monitoring complexity of the network device is increased. In addition, because uplink resources are limited, the solution in which the plurality of CG resources are configured for the terminal device causes relatively high uplink resource overheads. When a quantity of terminal devices is relatively large, sending of the dynamically scheduled PUSCH may be blocked because a quantity of uplink resources that can be dynamically scheduled is excessively small.

Therefore, how to reduce, without affecting scheduling flexibility, monitoring complexity, and uplink resource overheads of the network device, a latency of transmitting the uplink data of the URLLC service is a problem to be urgently resolved.

SUMMARY

Embodiments of this application provide a data transmission method and a device, to resolve a technical problem of how to reduce, without affecting scheduling flexibility, monitoring complexity, and uplink resource overheads of a network device, a latency of transmitting uplink data of a URLLC service.

According to a first aspect, an embodiment of this application provides a data transmission method. The method may be applied to a terminal device. The terminal device includes a terminal (for example, a mobile phone) or a chip used in the terminal. The following describes the method by using an example in which the method is applied to the terminal device. In the method, the terminal device may obtain a first resource and a second resource, where at least one first uplink transmission opportunity is configured for the first resource, a second uplink transmission opportunity is configured for the second resource, the first uplink transmission opportunity includes X repeated first uplink transmission resources, the second uplink transmission opportunity includes Y repeated second uplink transmission resources, and both X and Y are integers greater than or equal to 1.

In this scenario, the terminal device sends uplink data to a network device by using the second uplink transmission opportunity if sending using N closest first uplink transmission opportunities before the second uplink transmission opportunity is blocked. If sending using at least one of the N closest first uplink transmission opportunities before the second uplink transmission opportunity is unblocked, the terminal device determines that the second uplink transmission opportunity cannot be used to send the uplink data. In this case, the second resource may be scheduled by the network device to another terminal device for use. N is an integer greater than or equal to 1. For example, N is preset. Alternatively, the method further includes receiving, by the terminal device, second indication information from the network device, where the second indication information indicates N.

According to the foregoing method, the first resource used as a primary resource and the second resource used as a secondary resource are configured for the terminal device, so that when the first resource used as the primary resource encounters a scenario in which sending of a PUSCH is blocked, the terminal device may send the uplink data by using the second resource used as the secondary resource, to ensure a latency of the uplink data. Correspondingly, if the first resource does not encounter the scenario in which sending of the PUSCH is blocked, the network device may schedule the second resource to the another terminal device for use. When uplink data of a URLLC service is transmitted in this manner, a latency of transmitting the uplink data of the URLLC service can be reduced without affecting scheduling flexibility, monitoring complexity, and uplink resource overheads of the network device.

In a possible implementation, for example, that sending using the first uplink transmission opportunity is blocked may include sending on each of the X repeated first uplink transmission resources in the first uplink transmission opportunity is blocked, or a quantity of first uplink transmission resources on which sending is blocked and that are in the first uplink transmission opportunity is greater than or equal to a first preset threshold, where the first preset threshold is less than or equal to X. For example, that sending on the first uplink transmission resource is blocked may include at least one symbol in the first uplink transmission resource is a non-uplink symbol, or the terminal device sends the uplink data by using at least one non-uplink symbol in the first uplink transmission resource. In a possible implementation, the first preset threshold is preset, or the first preset threshold is determined based on a first configuration parameter and/or a second configuration parameter of the first resource, where the first configuration parameter is used to configure X, and the second configuration parameter is used to configure redundancy versions of uplink data allowed to be transmitted on the first uplink transmission resources in the first uplink transmission opportunity, or the method further includes receiving, by the terminal device, first indication information from the network device, where the first indication information indicates the first preset threshold.

In a possible implementation, a second uplink transmission opportunity after one of the at least one first uplink transmission opportunity and the first uplink transmission opportunity are neighboring in time domain, or a second uplink transmission opportunity after one of the at least one first uplink transmission opportunity and the first uplink transmission opportunity are neighboring in time domain, and have a same frequency domain position. In this manner of setting the first resource and the second resource, when sending on the first resource used as the primary resource is blocked, the terminal device may immediately send the uplink data by using the second uplink transmission opportunity configured for the second resource, to further shorten the latency of transmitting the uplink data.

The first resource and the second resource in this embodiment of this application may be preset for the terminal device, or may be configured by the network device for the terminal device by using higher layer signaling or physical layer signaling. The higher layer signaling is used as an example. That the terminal device obtains the first resource and the second resource includes receiving, by the terminal device, higher layer signaling from the network device. The higher layer signaling indicates the first resource and the second resource. The higher layer signaling includes a first information field and a second information field.

The first information field includes a first information subfield and/or a second information subfield. The first information subfield indicates time-frequency information of the first resource, and the second information subfield indicates a transmission parameter corresponding to the first resource. The transmission parameter of the first resource includes at least one of the following: X, the redundancy versions of the uplink data allowed to be transmitted on the first uplink transmission resources in the first uplink transmission opportunity, and a time interval between two neighboring first uplink transmission opportunities.

The second information field includes a third information subfield and/or a fourth information subfield. The third information subfield indicates time-frequency information of the second resource, and the fourth information subfield indicates a transmission parameter corresponding to the second resource. The transmission parameter of the second resource includes at least one of the following: Y, redundancy versions of uplink data allowed to be transmitted on the second uplink transmission resources in the second uplink transmission opportunity, and a time interval between two neighboring second uplink transmission opportunities.

In a possible implementation, if a plurality of groups of resources are configured for the terminal device, where each group of resources includes one first resource and a second resource corresponding to the first resource, the first information subfield and/or the second information subfield further indicate/indicates an identifier of a group to which the first resource belongs, and the third information subfield and/or the fourth information subfield further indicate/indicates an identifier of a group to which the second resource belongs.

In a possible implementation, the first information subfield and/or the second information subfield further indicate/indicates a type of the first resource, and/or the third information subfield and/or the fourth information subfield further indicate/indicates a type of the second resource.

In a possible implementation, if a resource configuration information element of the higher layer signaling does not include a radio resource control configured uplink grant parameter, the method further includes receiving, by the terminal device, control information from the network device, where the control information is used to activate or deactivate a resource.

In this implementation, optionally, the control information further indicates a type of the activated or deactivated resource, the first information subfield and/or the second information subfield further indicate/indicates a type of the first resource, and/or the third information subfield and/or the fourth information subfield further indicate/indicates a type of the second resource.

In this implementation, optionally, if a plurality of groups of resources are configured for the terminal device, where each group of grant resources includes one first resource and a second resource corresponding to the first resource, the control information further indicates an identifier of a group to which the activated or deactivated resource belongs.

In the foregoing manner, the network device may configure the first resource used as a primary resource and the second resource used as a secondary resource for the terminal device, so that when the first resource used as the primary resource encounters the scenario in which sending of the PUSCH is blocked, the terminal device may send the uplink data by using the second resource used as the secondary resource, to ensure the latency of the uplink data. Correspondingly, if the first resource does not encounter the scenario in which sending of the PUSCH is blocked, the network device may schedule the second resource to the another terminal device for use. When the uplink data of the URLLC service is transmitted in this manner, the latency of transmitting the uplink data of the URLLC service can be reduced without affecting scheduling flexibility, monitoring complexity, and uplink resource overheads of the network device.

According to a second aspect, an embodiment of this application provides a data transmission method. The method may be applied to a network side device. The network side device includes a network device (for example, a next generation nodeB (gNodeB, gNB)) or a chip used in the network device. The following describes the method by using an example in which the method is applied to the network device. In the method, the network device may obtain a first resource and a second resource that are configured for a terminal device, where at least one first uplink transmission opportunity is configured for the first resource, a second uplink transmission opportunity is configured for the second resource, the first uplink transmission opportunity includes X repeated first uplink transmission resources, the second uplink transmission opportunity includes Y repeated second uplink transmission resources, and both X and Y are integers greater than or equal to 1.

In this scenario, the network device monitors, on the second uplink transmission opportunity, uplink data from the terminal device if sending using N closest first uplink transmission opportunities before the second uplink transmission opportunity is blocked. If sending using at least one of the N closest first uplink transmission opportunities before the second uplink transmission opportunity is unblocked, the network device determines that the second uplink transmission opportunity cannot be used to send the uplink data. In this case, the second resource may be scheduled by the network device to another terminal device for use. N is an integer greater than or equal to 1. For example, N is preset. Alternatively, the method further includes sending, by the network device, second indication information to the terminal device, where the second indication information indicates N.

In a possible implementation, for example, that sending using the first uplink transmission opportunity is blocked may include sending on each of the X repeated first uplink transmission resources in the first uplink transmission opportunity is blocked, or a quantity of first uplink transmission resources on which sending is blocked and that are in the first uplink transmission opportunity is greater than or equal to a first preset threshold, where the first preset threshold is less than or equal to X. For example, that sending on the first uplink transmission resource is blocked may include at least one symbol in the first uplink transmission resource is a non-uplink symbol, or the terminal device sends the uplink data by using at least one non-uplink symbol in the first uplink transmission resource. In a possible implementation, the first preset threshold is preset, or the first preset threshold is determined based on a first configuration parameter and/or a second configuration parameter of the first resource, where the first configuration parameter is used to configure X, and the second configuration parameter is used to configure redundancy versions of uplink data allowed to be transmitted on the first uplink transmission resources in the first uplink transmission opportunity, or the method further includes sending, by the network device, first indication information to the terminal device, where the first indication information indicates the first preset threshold.

In a possible implementation, a second uplink transmission opportunity after one of the at least one first uplink transmission opportunity and the first uplink transmission opportunity are neighboring in time domain, or a second uplink transmission opportunity after one of the at least one first uplink transmission opportunity and the first uplink transmission opportunity are neighboring in time domain, and have a same frequency domain position.

The first resource and the second resource in this embodiment of this application may be preset for the terminal device, or may be configured by the network device for the terminal device by using higher layer signaling or physical layer signaling. The higher layer signaling is used as an example. The method further includes sending, by the network device, higher layer signaling to the terminal device. The higher layer signaling indicates the first resource and the second resource. The higher layer signaling includes a first information field and a second information field.

The first information field includes a first information subfield and/or a second information subfield. The first information subfield indicates time-frequency information of the first resource, and the second information subfield indicates a transmission parameter corresponding to the first resource. The transmission parameter of the first resource includes at least one of the following: X, the redundancy versions of the uplink data allowed to be transmitted on the first uplink transmission resources in the first uplink transmission opportunity, and a time interval between two neighboring first uplink transmission opportunities.

The second information field includes a third information subfield and/or a fourth information subfield. The third information subfield indicates time-frequency information of the second resource, and the fourth information subfield indicates a transmission parameter corresponding to the second resource. The transmission parameter of the second resource includes at least one of the following: Y, redundancy versions of uplink data allowed to be transmitted on the second uplink transmission resources in the second uplink transmission opportunity, and a time interval between two neighboring second uplink transmission opportunities.

In a possible implementation, if a plurality of groups of resources are configured for the terminal device, where each group of resources includes one first resource and a second resource corresponding to the first resource, the first information subfield and/or the second information subfield further indicate/indicates an identifier of a group to which the first resource belongs, and the third information subfield and/or the fourth information subfield further indicate/indicates an identifier of a group to which the second resource belongs.

In a possible implementation, the first information subfield and/or the second information subfield further indicate/indicates a type of the first resource, and/or the third information subfield and/or the fourth information subfield further indicate/indicates a type of the second resource.

In a possible implementation, if a resource configuration information element of the higher layer signaling does not include a radio resource control configured uplink grant parameter, the method further includes sending, by the network device, control information to the terminal device, where the control information is used to activate or deactivate a resource.

In this implementation, optionally, the control information further indicates a type of the activated or deactivated resource, the first information subfield and/or the second information subfield further indicate/indicates a type of the first resource, and/or the third information subfield and/or the fourth information subfield further indicate/indicates a type of the second resource.

In this implementation, optionally, if a plurality of groups of resources are configured for the terminal device, where each group of grant resources includes one first resource and a second resource corresponding to the first resource, the control information further indicates an identifier of a group to which the activated or deactivated resource belongs.

For beneficial effects of the data transmission method provided in the second aspect and the possible implementations of the second aspect, refer to the beneficial effects brought by the first aspect and the possible implementations of the first aspect. Details are not described herein again.

According to a third aspect, an embodiment of this application provides a terminal device. The terminal device includes a processing module and a sending module. In some embodiments, the terminal device may further include a receiving module.

The processing module is configured to obtain a first resource and a second resource, where at least one first uplink transmission opportunity is configured for the first resource, a second uplink transmission opportunity is configured for the second resource, the first uplink transmission opportunity includes X repeated first uplink transmission resources, the second uplink transmission opportunity includes Y repeated second uplink transmission resources, and both X and Y are integers greater than or equal to 1.

The sending module is configured to send uplink data to a network device by using the second uplink transmission opportunity when sending using N closest first uplink transmission opportunities before the second uplink transmission opportunity is blocked, where N is an integer greater than or equal to 1. For example, N is preset. Alternatively, the receiving module is configured to receive second indication information from the network device, where the second indication information indicates N.

In a possible implementation, the processing module is further configured to when sending using at least one of the N closest first uplink transmission opportunities before the second uplink transmission opportunity is unblocked, determine that the second uplink transmission opportunity cannot be used to send the uplink data.

In a possible implementation, for example, that sending using the first uplink transmission opportunity is blocked may include sending on each of the X repeated first uplink transmission resources in the first uplink transmission opportunity is blocked, or a quantity of first uplink transmission resources on which sending is blocked and that are in the first uplink transmission opportunity is greater than or equal to a first preset threshold, where the first preset threshold is less than or equal to X. For example, that sending on the first uplink transmission resource is blocked may include at least one symbol in the first uplink transmission resource is a non-uplink symbol, or the terminal device sends the uplink data by using at least one non-uplink symbol in the first uplink transmission resource. In a possible implementation, the first preset threshold is preset, or the first preset threshold is determined based on a first configuration parameter and/or a second configuration parameter of the first resource, where the first configuration parameter is used to configure X, and the second configuration parameter is used to configure redundancy versions of uplink data allowed to be transmitted on the first uplink transmission resources in the first uplink transmission opportunity, or the receiving module is configured to receive first indication information from the network device, where the first indication information indicates the first preset threshold.

In a possible implementation, a second uplink transmission opportunity after one of the at least one first uplink transmission opportunity and the first uplink transmission opportunity are neighboring in time domain, or a second uplink transmission opportunity after one of the at least one first uplink transmission opportunity and the first uplink transmission opportunity are neighboring in time domain, and have a same frequency domain position.

The first resource and the second resource in this embodiment of this application may be preset for the terminal device, or may be configured by the network device for the terminal device by using higher layer signaling or physical layer signaling. The higher layer signaling is used as an example. The processing module is specifically configured to receive higher layer signaling from the network device by using the receiving module. The higher layer signaling indicates the first resource and the second resource. The higher layer signaling includes a first information field and a second information field.

The first information field includes a first information subfield and/or a second information subfield. The first information subfield indicates time-frequency information of the first resource, and the second information subfield indicates a transmission parameter corresponding to the first resource. The transmission parameter of the first resource includes at least one of the following: X, the redundancy versions of the uplink data allowed to be transmitted on the first uplink transmission resources in the first uplink transmission opportunity, and a time interval between two neighboring first uplink transmission opportunities.

The second information field includes a third information subfield and/or a fourth information subfield. The third information subfield indicates time-frequency information of the second resource, and the fourth information subfield indicates a transmission parameter corresponding to the second resource. The transmission parameter of the second resource includes at least one of the following: Y, redundancy versions of uplink data allowed to be transmitted on the second uplink transmission resources in the second uplink transmission opportunity, and a time interval between two neighboring second uplink transmission opportunities.

In a possible implementation, if a plurality of groups of resources are configured for the terminal device, where each group of resources includes one first resource and a second resource corresponding to the first resource, the first information subfield and/or the second information subfield further indicate/indicates an identifier of a group to which the first resource belongs, and the third information subfield and/or the fourth information subfield further indicate/indicates an identifier of a group to which the second resource belongs.

In a possible implementation, the first information subfield and/or the second information subfield further indicate/indicates a type of the first resource, and/or the third information subfield and/or the fourth information subfield further indicate/indicates a type of the second resource.

In a possible implementation, if a resource configuration information element of the higher layer signaling does not include a radio resource control configured uplink grant parameter, the receiving module is further configured to receive control information from the network device, where the control information is used to activate or deactivate a resource.

In this implementation, optionally, the control information further indicates a type of the activated or deactivated resource, the first information subfield and/or the second information subfield further indicate/indicates a type of the first resource, and/or the third information subfield and/or the fourth information subfield further indicate/indicates a type of the second resource.

In this implementation, optionally, if a plurality of groups of resources are configured for the terminal device, where each group of grant resources includes one first resource and a second resource corresponding to the first resource, the control information further indicates an identifier of a group to which the activated or deactivated resource belongs.

For beneficial effects of the terminal device provided in the third aspect and the possible implementations of the third aspect, refer to the beneficial effects brought by the first aspect and the possible implementations of the first aspect. Details are not described herein again.

According to a fourth aspect, an embodiment of this application provides a network device. The network device includes a processing module. In some embodiments, the network device may further include a sending module.

The processing module is configured to obtain a first resource and a second resource that are configured for a terminal device, where at least one first uplink transmission opportunity is configured for the first resource, a second uplink transmission opportunity is configured for the second resource, the first uplink transmission opportunity includes X repeated first uplink transmission resources, the second uplink transmission opportunity includes Y repeated second uplink transmission resources, both X and Y are integers greater than or equal to 1, and N is an integer greater than or equal to 1.

In this scenario, the processing module monitors, on the second uplink transmission opportunity, uplink data from the terminal device when sending using N closest first uplink transmission opportunities before the second uplink transmission opportunity is blocked.

In a possible implementation, the processing module is further configured to when sending using at least one of the N closest first uplink transmission opportunities before the second uplink transmission opportunity is unblocked, determine that the second uplink transmission opportunity cannot be used to send the uplink data. For example, N is preset. Alternatively, the sending module is configured to send second indication information to the terminal device, where the second indication information indicates N.

In a possible implementation, for example, that sending using the first uplink transmission opportunity is blocked may include sending on each of the X repeated first uplink transmission resources in the first uplink transmission opportunity is blocked, or a quantity of first uplink transmission resources on which sending is blocked and that are in the first uplink transmission opportunity is greater than or equal to a first preset threshold, where the first preset threshold is less than or equal to X. For example, that sending on the first uplink transmission resource is blocked may include at least one symbol in the first uplink transmission resource is a non-uplink symbol, or the terminal device sends the uplink data by using at least one non-uplink symbol in the first uplink transmission resource. In a possible implementation, the first preset threshold is preset, or the first preset threshold is determined based on a first configuration parameter and/or a second configuration parameter of the first resource, where the first configuration parameter is used to configure X, and the second configuration parameter is used to configure redundancy versions of uplink data allowed to be transmitted on the first uplink transmission resources in the first uplink transmission opportunity, or the sending module is configured to send first indication information to the terminal device, where the first indication information indicates the first preset threshold.

In a possible implementation, a second uplink transmission opportunity after one of the at least one first uplink transmission opportunity and the first uplink transmission opportunity are neighboring in time domain, or a second uplink transmission opportunity after one of the at least one first uplink transmission opportunity and the first uplink transmission opportunity are neighboring in time domain, and have a same frequency domain position.

The first resource and the second resource in this embodiment of this application may be preset for the terminal device, or may be configured by the network device for the terminal device by using higher layer signaling or physical layer signaling. The higher layer signaling is used as an example. The sending module is configured to send higher layer signaling to the terminal device. The higher layer signaling indicates the first resource and the second resource. The higher layer signaling includes a first information field and a second information field.

The first information field includes a first information subfield and/or a second information subfield. The first information subfield indicates time-frequency information of the first resource, and the second information subfield indicates a transmission parameter corresponding to the first resource. The transmission parameter of the first resource includes at least one of the following: X, the redundancy versions of the uplink data allowed to be transmitted on the first uplink transmission resources in the first uplink transmission opportunity, and a time interval between two neighboring first uplink transmission opportunities.

The second information field includes a third information subfield and/or a fourth information subfield. The third information subfield indicates time-frequency information of the second resource, and the fourth information subfield indicates a transmission parameter corresponding to the second resource. The transmission parameter of the second resource includes at least one of the following: Y, redundancy versions of uplink data allowed to be transmitted on the second uplink transmission resources in the second uplink transmission opportunity, and a time interval between two neighboring second uplink transmission opportunities.

In a possible implementation, if a plurality of groups of resources are configured for the terminal device, where each group of resources includes one first resource and a second resource corresponding to the first resource, the first information subfield and/or the second information subfield further indicate/indicates an identifier of a group to which the first resource belongs, and the third information subfield and/or the fourth information subfield further indicate/indicates an identifier of a group to which the second resource belongs.

In a possible implementation, the first information subfield and/or the second information subfield further indicate/indicates a type of the first resource, and/or the third information subfield and/or the fourth information subfield further indicate/indicates a type of the second resource.

In a possible implementation, if a resource configuration information element of the higher layer signaling does not include a radio resource control configured uplink grant parameter, the sending module is further configured to send control information to the terminal device, where the control information is used to activate or deactivate a resource.

In this implementation, optionally, the control information further indicates a type of the activated or deactivated resource, the first information subfield and/or the second information subfield further indicate/indicates a type of the first resource, and/or the third information subfield and/or the fourth information subfield further indicate/indicates a type of the second resource.

In this implementation, optionally, if a plurality of groups of resources are configured for the terminal device, where each group of grant resources includes one first resource and a second resource corresponding to the first resource, the control information further indicates an identifier of a group to which the activated or deactivated resource belongs.

For beneficial effects of the network device provided in the fourth aspect and the possible implementations of the fourth aspect, refer to the beneficial effects brought by the first aspect and the possible implementations of the first aspect. Details are not described herein again.

According to a fifth aspect, an embodiment of this application provides a terminal device. The terminal device includes a processor, a memory, a receiver, and a transmitter.

Both the receiver and the transmitter are coupled to the processor. The processor controls a receiving action of the receiver, and the processor controls a sending action of the transmitter.

The memory is configured to store computer-executable program code. The program code includes instructions. When the processor executes the instructions, the instructions enable the terminal device to perform the method according to any one of the first aspect or the possible implementations of the first aspect.

According to a sixth aspect, an embodiment of this application provides a network device. The network device includes a processor and a memory.

The memory is configured to store computer-executable program code. The program code includes instructions. When the processor executes the instructions, the instructions enable the network device to perform the method according to any one of the second aspect or the possible implementations of the second aspect.

According to a seventh aspect, an embodiment of this application provides a communication apparatus, including units, modules, or circuits configured to perform the method according to any one of the first aspect or the possible implementations of the first aspect. The communication apparatus may be a terminal device, or may be a module used in the terminal device, for example, may be a chip used in the terminal device.

According to an eighth aspect, an embodiment of this application provides a communication apparatus, including units, modules, or circuits configured to perform the method according to any one of the second aspect or the possible implementations of the second aspect. The communication apparatus may be a network device, or may be a module used in the network device, for example, may be a chip used in the network device.

According to a ninth aspect, an embodiment of this application provides a chip. The chip stores a computer program. When the computer program is executed by the chip, the method according to any one of the first aspect or the possible implementations of the first aspect is implemented.

According to a tenth aspect, an embodiment of this application provides a chip. The chip stores a computer program. When the computer program is executed by the chip, the method according to any one of the second aspect or the possible implementations of the second aspect is implemented.

According to an eleventh aspect, an embodiment of this application provides a computer program product including instructions. When the computer program product runs on a computer, the computer is enabled to perform the method according to any one of the first aspect or the possible implementations of the first aspect.

According to a twelfth aspect, an embodiment of this application provides a computer program product including instructions. When the computer program product runs on a computer, the computer is enabled to perform the method according to any one of the second aspect or the possible implementations of the second aspect.

According to a thirteenth aspect, an embodiment of this application provides a computer-readable storage medium. The computer-readable storage medium stores instructions. When the instructions are run on a computer, the computer is enabled to perform the method according to any one of the first aspect or the possible implementations of the first aspect.

According to a fourteenth aspect, an embodiment of this application provides a computer-readable storage medium. The computer-readable storage medium stores instructions. When the instructions are run on a computer, the computer is enabled to perform the method according to any one of the second aspect or the possible implementations of the second aspect.

In view of the data transmission method and the device that are provided in the embodiments of this application, the first resource used as the primary resource and the second resource used as the secondary resource are configured for the terminal device, so that when the first resource used as the primary resource encounters the scenario in which sending of the PUSCH is blocked, the terminal device may send the uplink data by using the second resource used as the secondary resource, to ensure the latency of the uplink data. Correspondingly, if the first resource does not encounter the scenario in which sending of the PUSCH is blocked, the network device may schedule the second resource to the another terminal device for use. When the uplink data of the URLLC service is transmitted in this manner, the latency of transmitting the uplink data of the URLLC service can be reduced without affecting scheduling flexibility, monitoring complexity, and uplink resource overheads of the network device.

DETAILED DESCRIPTION OF ILLUSTRATIVE EMBODIMENTS

Figure 1:
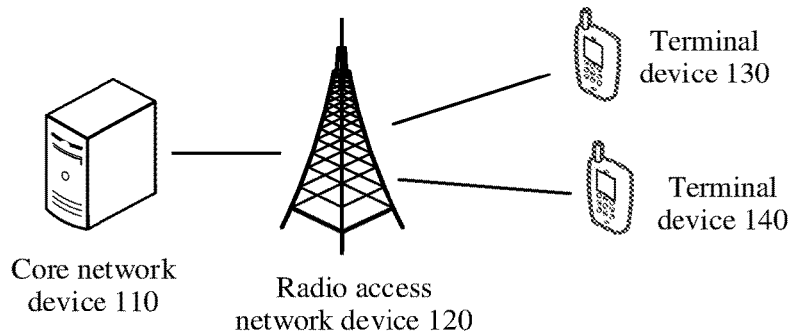
FIG. 1 is a schematic diagram of an architecture of a mobile communication system used in an embodiment of this application.

FIG. 1 is a schematic diagram of an architecture of a mobile communication system used in an embodiment of this application. As shown in FIG. 1, the mobile communication system may include a core network device 110, a radio access network device 120, and at least one terminal device (for example, a terminal device 130 and a terminal device 140 shown in FIG. 1). The terminal device is connected to the radio access network device 120 in a wireless manner, and the radio access network device 120 is connected to the core network device 110 in a wireless or wired manner. The core network device 110 and the radio access network device 120 may be different independent physical devices, or functions of the core network device 110 and logical functions of the radio access network device 120 may be integrated on a same physical device, or some of functions of the core network device 110 and some of functions of the radio access network device 120 may be integrated on one physical device. The terminal device may be at a fixed position or may be movable. FIG. 1 is only the schematic diagram, and the mobile communication system may further include another network device, for example, may further include a wireless relay device and a wireless backhaul device. The another network device is not shown in FIG. 1. A quantity of core network devices 110, radio access network devices 120, and terminal devices included in the mobile communication system is not limited in this embodiment of this application.

The radio access network device 120 is a device in a wireless network, for example, a radio access network (RAN) node that connects the terminal device to the wireless network. Currently, some examples of the RAN node are a gNodeB gNB in a 5G mobile communication system or a new radio (NR) communication system, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a base band unit (BBU), or a wireless fidelity (Wi-Fi) access point (AP). In a network structure, the network device may include a central unit (CU) node, a distributed unit (DU) node, a RAN device including the CU node and the DU node, or the like. A specific technology and a specific device form that are used by the radio access network device 120 are not limited in this embodiment of this application. In the embodiments of this application, the radio access network device 120 is referred to as a network device for short. If there is no particular description, all network devices in the embodiments of this application mean radio access network devices 120. In addition, the terminology 5G may be equivalent to NR in the embodiments of this application.

The terminal device is also referred to as user equipment (UE), a mobile station (MS), a mobile terminal (MT), or the like, and is a device that provides voice/data connectivity for a user, for example, a handheld device or a vehicle-mounted device that has a wireless connection function. Currently, some examples of the terminal device are a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, or a wireless terminal in a smart home.

The radio access network device 120 and the terminal device may be deployed on land, and include an indoor or outdoor device, a handheld device, or a vehicle-mounted device, or may be deployed on water, or may be deployed on a plane, a balloon, and a satellite in air. An application scenario of the radio access network device 120 and the terminal device is not limited in the embodiments of this application.

Communication between the radio access network device 120 and the terminal device may be performed by using a licensed spectrum, an unlicensed spectrum, or both the licensed spectrum and the unlicensed spectrum. Communication between the radio access network device 120 and the terminal device may be performed by using a spectrum below 6 gigahertz (GHz), a spectrum above 6 GHz, or both the spectrum below 6 GHz and the spectrum above 6 GHz. A spectrum resource used between the radio access network device 120 and the terminal device is not limited in the embodiments of this application.

For example, the mobile communication system shown in FIG. 1 is an NR mobile communication system. In the NR system, the terminal device may send a physical uplink shared channel (PUSCH) to the network device in the following three manners.

Manner 1: The PUSCH is sent by using a resource dynamically scheduled by the network device for the terminal device. That is, each time the terminal device receives one time of uplink scheduling of the network device, the terminal device may send the PUSCH once.

Manner 2: The PUSCH is sent by using a configured grant (CG) resource semi-persistently configured by the network device. That is, when the terminal device needs to send the PUSCH, the terminal device does not need to wait for dynamic scheduling of the network device, and may directly send the PUSCH by using the CG resource.

It should be understood that the PUSCH mainly carries uplink data. Therefore, that the terminal device sends the PUSCH to the network device may also be referred to as that the terminal device sends the uplink data to the network device. In the embodiments of this application, the PUSCH is equivalent to the uplink data, and no distinction is made between the PUSCH and the uplink data.

Currently, the terminal device may initially transmit the uplink data by using the CG resource. If the network device does not correctly receive the uplink data initially transmitted by the terminal device, the network device may subsequently dynamically schedule a resource for retransmitting the uplink data (retransmission scheduling), so that the terminal device retransmits the uplink data by using the dynamically scheduled resource (that is, the uplink data is retransmitted in Manner 1). If the terminal device does not receive retransmission scheduling of the network device after initially transmitting the uplink data, the terminal device determines that the network device correctly receives the initially transmitted uplink data.

The following describes the CG resource. In the NR system, the CG resource is a non-dynamically scheduled resource, and may include the following two types.

Type-1 CG resource (namely, configured grant Type 1): The network device semi-persistently configures, for the terminal device by using higher layer signaling, namely, radio resource control (RRC) signaling, time-frequency information of the type-1 CG resource and a transmission parameter corresponding to the type-1 CG resource. After the type-1 CG resource is configured for the terminal device, when the terminal device needs to send the uplink data, the terminal device may directly send the uplink data by using the type-1 CG resource, and does not need to wait for dynamic scheduling of the network device. In some embodiments, the type-1 CG resource may also be referred to as a configured uplink grant, a grant free resource, or the like.

Type-2 CG resource (namely, configured grant Type 2): The network device semi-persistently configures, for the terminal device by using RRC signaling, a transmission parameter corresponding to the type-2 CG resource. After the type-2 CG resource is configured for the terminal device, if the network device subsequently activates the type-2 CG resource and configures time-frequency information of the type-2 CG resource by using downlink control information (DCI) at a physical layer, when the terminal device needs to send the uplink data, the terminal device may directly send the uplink data by using the type-2 CG resource, and does not need to wait for dynamic scheduling of the network device. If the network device deactivates the type-2 CG resource by using DCI, or the network device does not activate the type-2 CG resource, the terminal device cannot send the uplink data by using the type-2 CG resource. In some embodiments, the type-2 CG resource may also be referred to as a configured uplink grant based on L1 signaling (namely, a configured uplink grant based on L1 signaling), an uplink semi-persistent scheduling (SPS) resource, or the like.

It should be noted that the network device may indicate, depending on whether an information element (IE) resource configuration (namely, configuredGrantConfig) of RRC signaling includes an rrc-ConfiguredUplinkGrant parameter, a type of a CG resource configured by using the higher layer signaling. When the IE configuredGrantConfig of the RRC signaling includes the rrc-ConfiguredUplinkGrant parameter, it indicates that the CG resource configured by using the RRC signaling is the type-1 CG resource. When the IE configuredGrantConfig of the RRC signaling does not include the rrc-ConfiguredUplinkGrant parameter, it indicates that the CG resource configured by using the RRC signaling is the type-2 CG resource.

Figure 2:
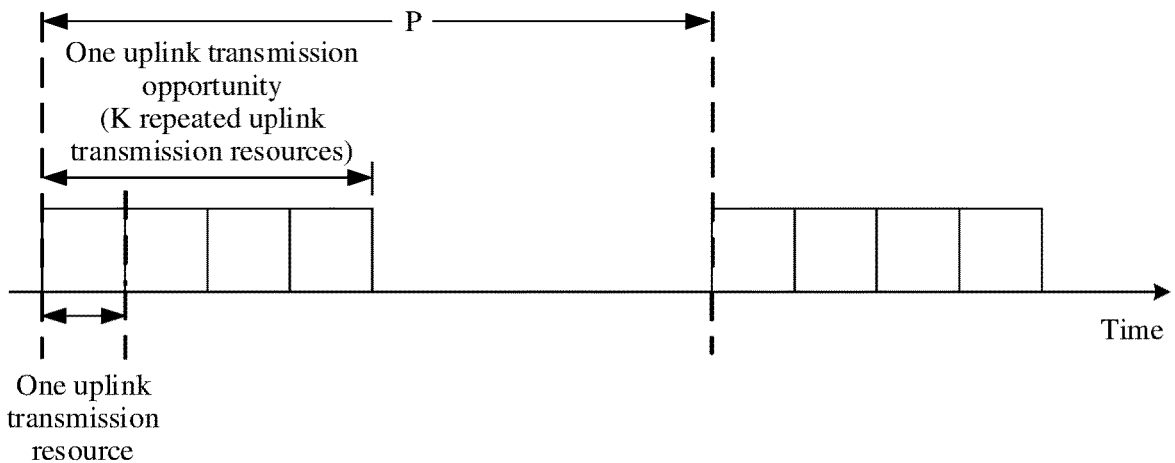
FIG. 2 is a schematic diagram of a CG resource.

FIG. 2 is a schematic diagram of a CG resource. As shown in FIG. 2, regardless of the type-1 CG resource or the type-2 CG resource, at least one uplink transmission opportunity is configured, each uplink transmission opportunity may include at least one repeated uplink transmission resource, and each uplink transmission resource may be used to transmit the uplink data once. The uplink transmission resource may occupy at least one symbol in time domain. In other words, a quantity of uplink transmission resources included in one uplink transmission opportunity indicates a quantity of times the uplink data can be repeatedly transmitted. FIG. 2 is a schematic diagram of an example in which two uplink transmission opportunities are configured for the CG resource and either uplink transmission opportunity includes four repeated uplink transmission resources. That is, one uplink transmission opportunity shown in FIG. 2 may be used to repeatedly transmit one piece of uplink data for four times. It should be understood that the uplink transmission opportunity herein may also be referred to as a candidate uplink transmission opportunity. That is, the terminal device may send the uplink data by using the uplink transmission opportunity.

It should be noted that uplink transmission resources included in one uplink transmission opportunity may be uplink transmission resources that are consecutive in terms of time, or may be transmission resources that are repeated in consecutive time units. The NR system is used as an example. The time unit herein may be, for example, a slot in the NR system. One uplink transmission opportunity of the CG resource shown in FIG. 2 is used as an example. If uplink transmission resources included in the uplink transmission opportunity are transmission resources that are repeated in consecutive slots, the first one of the uplink transmission resources in the uplink transmission opportunity may be located in, for example, a slot n, the second one of the uplink transmission resources may be located in, for example, a slot n+1, the third one of the uplink transmission resources may be located in, for example, a slot n+2, and the fourth one of the uplink transmission resources may be located in, for example, a slot n+3. Positions of the uplink transmission resources in the slots in which the uplink transmission resources are located are the same (for example, the positions each are the second symbol and the third symbol in the slot). If uplink transmission resources included in the uplink transmission opportunity are uplink transmission resources that are consecutive in terms of time, where a slot is used as an example, the first one of the uplink transmission resources in the uplink transmission opportunity may be located on, for example, the second symbol and the third symbol in a slot n, the second one of the uplink transmission resources may be located on, for example, the fourth symbol and the fifth symbol in the slot n, the third one of the uplink transmission resources may be located on, for example, the sixth symbol and the seventh symbol in the slot n, and the fourth one of uplink transmission resources may be located on, for example, the eighth symbol and the ninth symbol in the slot n.

With reference to the CG resource shown in FIG. 2, the following describes, by using Table 1, how the network device configures, for the terminal device by using the higher layer signaling, the time-frequency information of the type-1 CG resource and the transmission parameter corresponding to the type-1 CG resource.

TABLE 1

| RRC signaling | |
|---|---|
| Public parameter | rrc-ConfiguredUplinkGrant parameter |
| Periodicity (namely, Periodicity) | Time domain offset (namely, timeDomainOffset) |
| Quantity of repetitions (namely, repK) | Time domain resource assignment (namely, timeDomainAllocation) |

TABLE 1-continued

| RRC signaling | |
|---|---|
| Public parameter | rrc-ConfiguredUplinkGrant parameter |
| Redundancy versions (namely, repK-RV) of uplink data allowed to be transmitted on uplink transmission resources in an uplink transmission opportunity | Frequency domain resource assignment (namely, frequencyDomainAllocation) |

The periodicity, the quantity of repetitions (namely, repK), and the redundancy versions (namely, repK-RV) of the uplink data allowed to be transmitted on the uplink transmission resources in the uplink transmission opportunity are transmission parameters. The time domain offset, the time domain resource assignment, and the frequency domain resource assignment jointly indicate the time-frequency information of the CG resource. It should be understood that, that the periodicity, the quantity of repetitions (namely, repK), and the redundancy versions (namely, repK-RV) of the uplink data allowed to be transmitted on the uplink transmission resources in the uplink transmission opportunity are referred to as transmission parameters is only for ease of subsequent description, and is not intended to limit the three parameters.

Periodicity: P for short. P represents a time interval between two neighboring transmission opportunities in the CG resource, where two symbols P 5120 time units.

repK: K for short. K represents a quantity of repeated uplink transmission resources included in each uplink transmission opportunity. Usually, values of K include {1, 2, 4, 8}. When P is less than or equal to one time unit, a value of K is 1.

The redundancy versions (RV) of the uplink data allowed to be transmitted on the uplink transmission resources in the uplink transmission opportunity: repK-RV for short. repK-RV represents RV version patterns allowed to be transmitted on K repeated uplink transmission resources. For example, an RV version pattern allowed to be transmitted on a $q^{th}$ uplink transmission resource in the K repeated uplink transmission resources is an $(\text{mod}(n-1, 4)+1)^{th}$ RV version pattern in an RV sequence, where q=1, 2, . . . , K.

repK-RV includes four cases: not configured, configured as {0, 2, 3, 1}, configured as {0, 3, 0, 3}, and configured as {0, 0, 0, 0}. It should be understood that when K is equal to 1, repK-RV is not configured, that is, a value of repK-RV is 0. In this scenario, the RV version pattern allowed to be transmitted on the uplink transmission resource in the uplink transmission opportunity of the CG resource is the zero$^{th}$ RV version pattern in the RV sequence. For example, K is equal to 4, and repK-RV is configured as {0, 2, 3, 1}. If the terminal device initially transmits the uplink data by using one uplink transmission opportunity of the type-1 CG resource, the terminal device may transmit a zero$^{th}$ RV version pattern of the uplink data on the first uplink transmission resource in the uplink transmission opportunity, transmit a second RV version pattern of the uplink data on the second uplink transmission resource in the uplink transmission opportunity, transmit a third RV version pattern of the uplink data on the third uplink transmission resource in the uplink transmission opportunity, and transmit a first RV version pattern of the uplink data on the fourth uplink transmission resource in the uplink transmission opportunity.

Time domain offset (namely, timeDomainOffset): represents an offset of the CG resource relative to a system frame "numbered 0" in time domain.

Time domain resource assignment (namely, timeDomainAllocation): represents a mapping parameter of the PUSCH in time domain, for example, a start symbol and a time length of PUSCH mapping.

Frequency domain resource assignment (namely, frequencyDomainAllocation): represents a frequency domain resource for mapping the PUSCH.

It should be understood that Table 1 shows only the parameters related to the CG resource in the RRC signaling. Other parameters included in the RRC signaling are not described again in this embodiment of this application.

With reference to the CG resource shown in FIG. 2, the following describes, by using Table 2, how the network device configures, for the terminal device by using the higher layer signaling, the transmission parameter corresponding to the type-2 CG resource, and configures the time-frequency information of the type-2 CG resource for the terminal device by using the DCI for activating the type-2 CG resource.

TABLE 2

| RRC signaling | DCI |
|---|---|
| Public parameter | Time domain resource assignment |
| Periodicity | (namely, time domain resource assignment) |
| Quantity of repetitions (namely, repK) | Frequency domain resource |
| Redundancy versions (namely, repK-RV) of uplink data allowed to be transmitted on uplink transmission resources in an uplink transmission opportunity | assignment (namely, frequency domain resource assignment) |

The periodicity, the quantity of repetitions (namely, repK), and the redundancy versions (namely, repK-RV) of the uplink data allowed to be transmitted on the uplink transmission resources in the uplink transmission opportunity are transmission parameters. The time domain resource assignment and the frequency domain resource assignment jointly indicate the time-frequency information of the CG resource. For P, repK, and repK-RV, refer to the foregoing descriptions. Details are not described herein again.

Time domain resource assignment (namely, time domain resource assignment): represents a mapping parameter of the PUSCH in time domain, for example, a start symbol and a time length of PUSCH mapping.

Frequency domain resource assignment (namely, frequency domain resource assignment): represents a frequency domain resource for mapping the PUSCH.

It should be understood that Table 2 shows only the parameters related to the CG resource in the RRC signaling and the DCI. Other parameters included in the RRC signaling and the DCI are not described again in this embodiment of this application.

It can be learned from Table 1 and Table 2 that the type-1 CG resource is configured by using the higher layer signaling (namely, the RRC signaling), and the type-2 CG resource is jointly configured by using the higher layer signaling (namely, the RRC signaling) and the DCI (for example, DCI 0_0/DCI 0_1) for activating the CG resource.

The following application document uses the CG resource as an example for description. The CG resource may be the type-1 CG resource, or may be the type-2 CG resource. This is not distinguished in the embodiments of this application.

Because the CG resource is configured by the network device for the terminal device, when a value of K is greater than 1, the CG resource may conflict with a higher layer configuration of a cell in which the terminal device is located. Consequently, sending of the PUSCH is blocked. For example, the following scenarios in which sending of the PUSCH is blocked may be included.

Scenario 1: A symbol configured, for the terminal device to send the PUSCH, by using higher layer signaling by using the CG resource (a PUSCH symbol A for short) is configured as a downlink symbol by using higher layer signaling (for example, tdd-UL-DL-ConfigurationCommon or tdd-UL-DL-ConfigurationDedicated) related to a time unit configuration.

In this scenario, an uplink transmission resource on which the PUSCH symbol A is located cannot be used to send the PUSCH (or the PUSCH symbol A cannot be used to send the PUSCH). In this case, the uplink transmission resource on which the PUSCH symbol A is located may be considered as that sending is blocked.

It should be understood that, for the type-1 CG resource, each symbol included in all uplink transmission resources in each uplink transmission opportunity of the type-1 CG resource may be referred to as the PUSCH symbol A. For the type-2 CG resource, except the first one of uplink transmission opportunities after the DCI (for example, DCI format 0_0 or 0_1) for activating the type-2 CG resource is received, each symbol included in all uplink transmission resources in other transmission opportunities of the type-2 CG resource may be referred to as the PUSCH symbol A.

Scenario 2: A PUSCH symbol A is semi-persistently configured as a flexible symbol by using higher layer signaling related to a time unit configuration, or no higher layer parameter is used to perform uplink and downlink semi-persistent configuration. Subsequently, the network device indicates, by using DCI (for example, DCI format 1_0/1_1/0_1), that the PUSCH symbol A is a downlink symbol. The downlink signal may be used to send a physical downlink shared channel (PDSCH) or a channel state information (CSI)-reference signal (RS).

In this scenario, an uplink transmission resource on which the PUSCH symbol A is located cannot be used to send the PUSCH (or the PUSCH symbol A cannot be used to send the PUSCH), unless the PUSCH symbol A is a symbol on which sending of the PUSCH may not be canceled in time. In this case, the uplink transmission resource on which the PUSCH symbol A is located may be considered as that sending is blocked. It should be understood that the symbol on which sending of the PUSCH may not be canceled in time herein is N2 symbols after the last symbol of the DCI. N2 may be determined based on a PUSCH preparation time corresponding to a PUSCH timing capability of the terminal device.

For example, a time unit is the slot in the NR system. The terminal device receives the DCI on the third symbol in the slot n. The PUSCH symbol A is the fifth symbol in the slot n. The terminal device parses the DCI on the sixth symbol in the slot n, to learn that the DCI indicates that the PUSCH symbol A is the downlink symbol. In this case, if the terminal device has sent the uplink data by using the PUSCH symbol A, the PUSCH symbol A is a symbol on which sending of the PUSCH cannot be canceled in time. The uplink data sent by the terminal device by using the PUSCH symbol A is interfered with by downlink data sent by the network device on the symbol. Consequently, the uplink data fails to be sent. In this scenario, the uplink transmission resource on which the PUSCH symbol A is located may be considered as that sending is blocked.

Scenario 3: A PUSCH symbol A is semi-persistently configured as a flexible symbol by using higher layer signaling related to a time unit configuration, or no higher layer parameter is used to perform uplink and downlink semi-persistent configuration. In addition, the terminal device is configured to monitor DCI used to indicate a time unit format, and detects the DCI. The DCI indicates that the PUSCH symbol A is a downlink symbol or a flexible symbol. For example, a time unit is a slot. In this case, the DCI may be, for example, DCI used to perform a slot format indicator (SFI), for example, DCI format 2_0.

In this scenario, an uplink transmission resource on which the PUSCH symbol A is located cannot be used to send the PUSCH (or the PUSCH symbol A cannot be used to send the PUSCH), unless the PUSCH symbol A is a symbol on which sending of the PUSCH may not be canceled in time. In this case, the uplink transmission resource on which the PUSCH symbol A is located may be considered as that sending is blocked.

For descriptions of a symbol on which sending of the PUSCH cannot be canceled in time, refer to descriptions in Scenario 2.

Scenario 4: A PUSCH symbol A is semi-persistently configured as a flexible symbol by using higher layer signaling related to a time unit configuration, or no higher layer parameter is used to perform uplink and downlink semi-persistent configuration. In addition, the terminal device is configured to monitor DCI used to indicate a time unit format, but does not detect the DCI.

In this scenario, an uplink transmission resource on which the PUSCH symbol A is located cannot be used to send the PUSCH (or the PUSCH symbol A cannot be used to send the PUSCH), unless the PUSCH symbol A is a symbol on which sending of the PUSCH may not be canceled in time. In this case, the uplink transmission resource on which the PUSCH symbol A is located may be considered as that sending is blocked.

For descriptions of a symbol on which sending of the PUSCH cannot be canceled in time, refer to descriptions in Scenario 2.

Scenario 5: For the type-2 CG resource, a symbol included in an uplink transmission resource of the first one of uplink transmission opportunities after the terminal device receives the DCI (for example, DCI format 0_0 or 0_1) for activating the type-2 CG resource (a PUSCH symbol B for short) is configured as a downlink symbol by using higher layer signaling related to a time unit configuration.

In this scenario, an uplink transmission resource on which the PUSCH symbol B is located cannot be used to send the PUSCH (in other words, the PUSCH symbol B cannot be used to send the PUSCH). In this case, the uplink transmission resource on which the PUSCH symbol B is located may be considered as that sending is blocked.

An ultra-reliable and low-latency communications (URLLC) service is an important service in the NR system, and requires quite high reliability and a quite low latency during transmission. When the terminal device sends uplink data of the URLLC service by using the CG resource, if sending of the PUSCH is blocked, a latency of transmitting the URLLC service increases, and a latency requirement of the URLLC service may not be satisfied.

Figure 3:
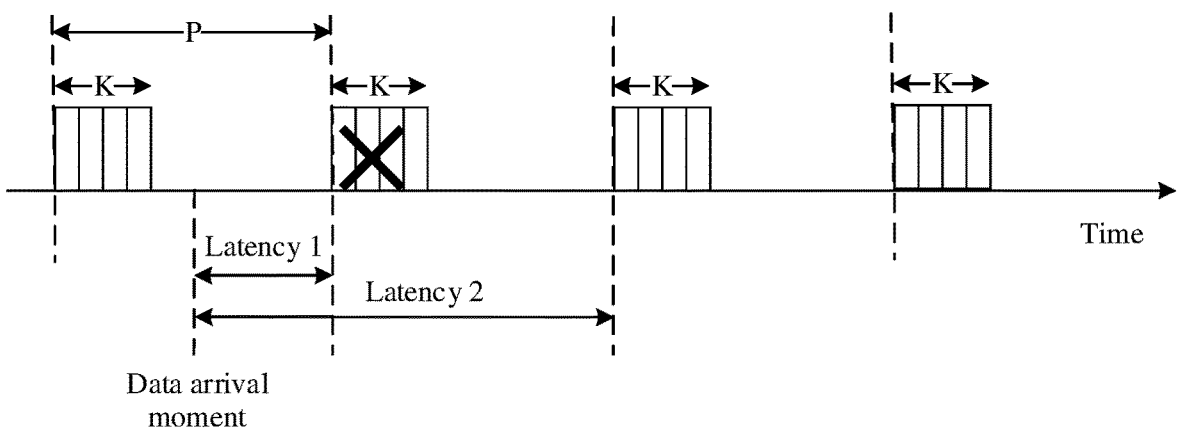
FIG. 3 is a schematic diagram of transmission of a URLLC service.

FIG. 3 is a schematic diagram of transmission of a URLLC service. As shown in FIG. 3, if sending using the first one of uplink transmission opportunities after a moment at which uplink data of the URLLC service arrives is unblocked, the terminal device may directly send the uplink data of the URLLC service by using the first one of the uplink transmission opportunities. In this scenario, a latency of the URLLC service is a latency 1. If sending using the first one of uplink transmission opportunities after a moment at which uplink data of the URLLC service arrives is blocked, but sending using the second one of uplink transmission opportunities is unblocked, the terminal device sends the uplink data of the URLLC service by using the second one of the uplink transmission opportunities. Consequently, a latency of the URLLC service is increased to a latency 2. If the latency 2 exceeds a maximum latency requirement of the URLLC service, transmission of the uplink data this time cannot satisfy a latency requirement of the URLLC service. For an introduction about that sending using an uplink transmission opportunity is blocked, refer to subsequent descriptions.

In view of the latency requirement of the URLLC service, the following two solutions are proposed in a conventional technology.

Solution 1: The network device avoids, as much as possible through scheduling, that sending of the PUSCH is blocked. However, the solution affects scheduling flexibility of the network device.

Solution 2: The network device configures a plurality of CG resources for the terminal device.

However, when none of the plurality of CG resources encounters the scenario in which sending of the PUSCH is blocked, because the network device does not determine a CG resource, where the terminal device sends the uplink data by using an uplink transmission opportunity of the CG resource, the network device needs to monitor, on the plurality of CG resources, the uplink data from the terminal device. Consequently, monitoring complexity of the network device is increased. In addition, because uplink resources are limited, the solution in which the plurality of CG resources are configured for the terminal device causes relatively high uplink resource overheads. When a quantity of terminal devices is relatively large, sending of a dynamically scheduled PUSCH may be blocked because a quantity of uplink resources that can be dynamically scheduled is excessively small.

Therefore, how to reduce, without affecting scheduling flexibility, monitoring complexity, and uplink resource overheads of the network device, a latency of transmitting the uplink data of the URLLC service is a problem to be urgently resolved.

In view of the foregoing problem, the embodiments of this application provide a data transmission method. A first resource used as a primary resource and a second resource used as a secondary resource are configured for the terminal device, so that when the first resource used as the primary resource encounters the scenario in which sending of the PUSCH is blocked, the terminal device may send the uplink data by using the second resource used as the secondary resource, to ensure a latency of the uplink data. Correspondingly, if the first resource does not encounter the scenario in which sending of the PUSCH is blocked, the network device may schedule the second resource to another terminal device for use. When the uplink data of the URLLC service is transmitted in this manner, the latency of transmitting the uplink data of the URLLC service can be reduced without affecting scheduling flexibility, monitoring complexity, and uplink resource overheads of the network device. It should be understood that the method provided in the embodiments of this application includes but is not limited to a scenario in which the uplink data of the URLLC service is transmitted, and is applicable to any scenario in which the uplink data is sent. Details are not described again. In addition, the method in the embodiments of this application includes but is not limited to a scenario in which the uplink data is transmitted for the first time, and is also applicable to a scenario in which the uplink data is retransmitted.

The following describes the technical solutions in this application in detail by using some embodiments. The following several embodiments may be combined with each other, and a same or similar concept or process may not be described repeatedly in some embodiments.

Figure 4:
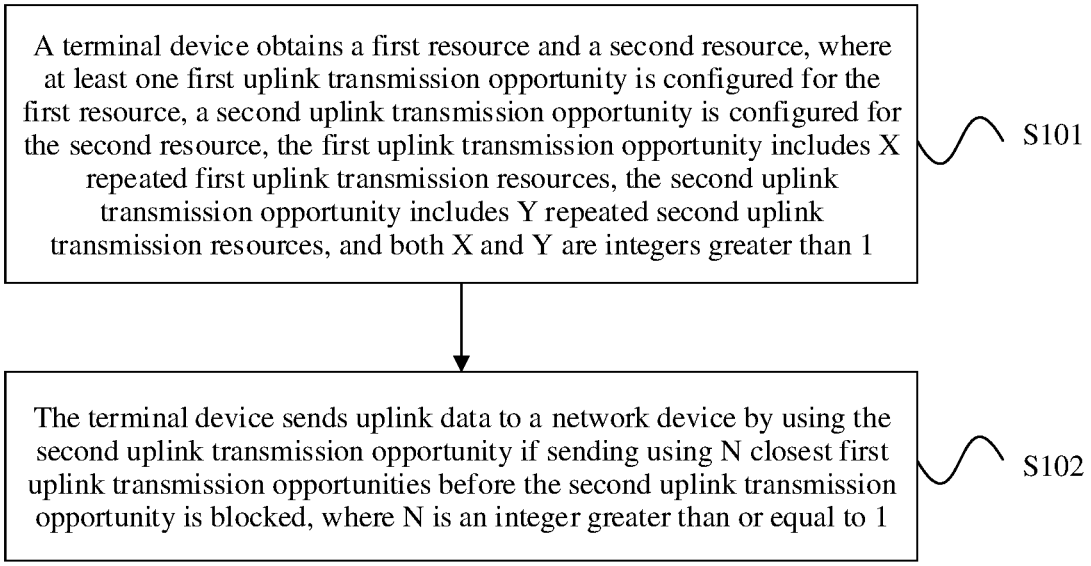
FIG. 4 is a schematic flowchart of a data transmission method according to an embodiment of this application.

FIG. 4 is a schematic flowchart of a data transmission method according to an embodiment of this application. As shown in FIG. 4, the method may include the following steps.

S101: A terminal device obtains a first resource and a second resource, where at least one first uplink transmission opportunity is configured for the first resource, a second uplink transmission opportunity is configured for the second resource, the first uplink transmission opportunity includes X repeated first uplink transmission resources, the second uplink transmission opportunity includes Y repeated second uplink transmission resources, and both X and Y are integers greater than 1.

S102: The terminal device sends uplink data to a network device by using the second uplink transmission opportunity if sending using N closest first uplink transmission opportunities before the second uplink transmission opportunity is blocked, where N is an integer greater than or equal to 1.

In this embodiment, the first resource used as a primary resource and the second resource used as a secondary resource are configured for the terminal device. The first resource and the second resource may be the foregoing semi-persistently configured CG resources (namely, non-dynamically scheduled resources), or may be resources dynamically scheduled by the network device for the terminal device. For example, both the first resource and the second resource are type-1 CG resources, the first resource is a type-1 CG resource, and the second resource is a type-2 CG resource, the first resource is a type-1 CG resource, and the second resource is a dynamically scheduled resource, both the first resource and the second resource are type-2 CG resources, the first resource is a type-2 CG resource, and the second resource is a type-1 CG resource, the first resource is a type-2 CG resource, and the second resource is a dynamically scheduled resource, both the first resource and the second resource are dynamically scheduled resources, the first resource is a dynamically scheduled resource, and the second resource is a type-1 CG resource, or the first resource is a dynamically scheduled resource, and the second resource is a type-2 CG resource.

It should be understood that at least one second uplink transmission opportunity may be configured for the second resource, and the at least one second uplink transmission opportunity may occur periodically. For example, both the first resource and the second resource are CGs. In this example, a periodicity P of the at least one first uplink transmission opportunity configured for the first resource may be the same as or different from a periodicity P of the at least one second uplink transmission opportunity configured for the second resource. That is, the at least one first uplink transmission opportunity configured for the first resource and the at least one second uplink transmission opportunity configured for the second resource may occur on a same frequency or different frequencies. Correspondingly, the quantity X of the repeated first uplink transmission resources included in the first uplink transmission opportunity may be equal to or not equal to the quantity Y of the repeated second uplink transmission resources included in the second uplink transmission opportunity.

The following describes a relationship between the first resource and the second resource in time domain and frequency domain by using an example in which the first uplink transmission opportunity configured for the first resource includes four repeated first uplink transmission resources and the second uplink transmission opportunity configured for the second resource includes three repeated second uplink transmission resources.

Figure 5:
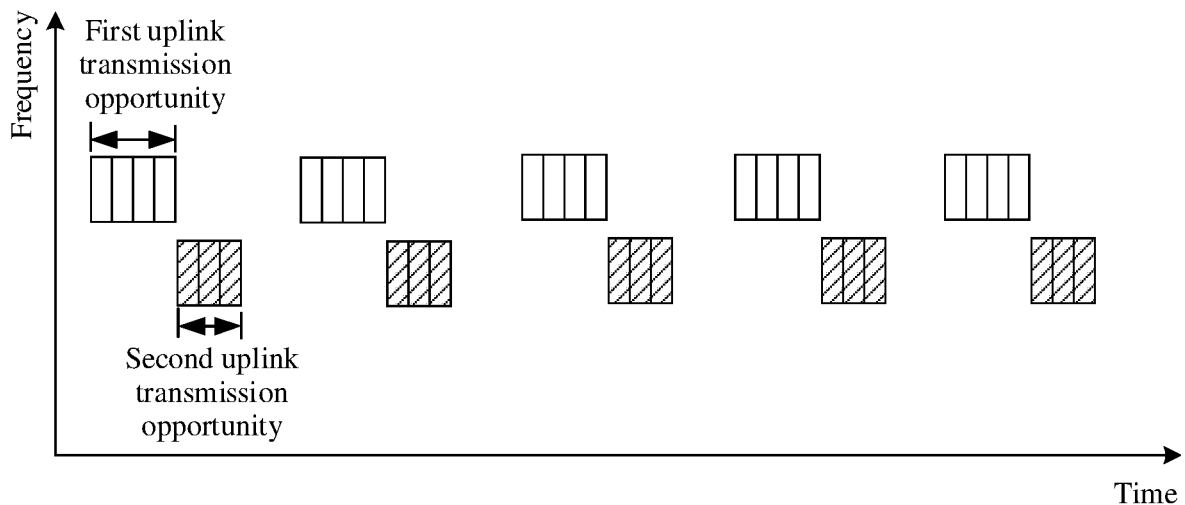
FIG. 5 is a schematic diagram of resource distribution with the at least one first uplink transmission opportunity and the first uplink transmission opportunity neighboring in the time domain and with different frequencies according to an embodiment of this application.
Figure 6:
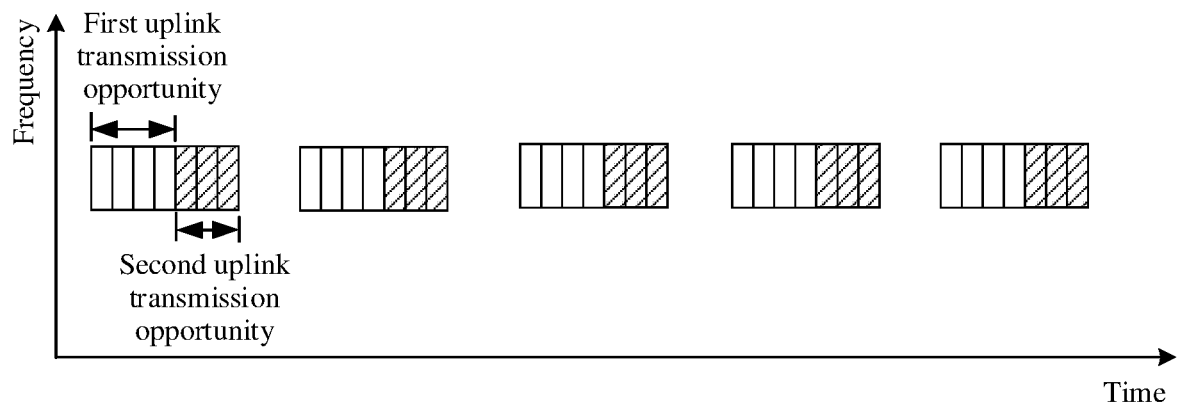
FIG. 6 is another schematic diagram of resource distribution with the at least one first uplink transmission opportunity and the first uplink transmission opportunity neighboring in the time domain and with the same frequency according to an embodiment of this application.

FIG. 5 is a schematic diagram of resource distribution according to an embodiment of this application, and FIG. 6 is another schematic diagram of resource distribution according to an embodiment of this application. A relationship between the first uplink transmission opportunity configured for the first resource and the second uplink transmission opportunity configured for the second resource in time domain may be shown in FIG. 5 and FIG. 6. That is, a second uplink transmission opportunity after one of the at least one first uplink transmission opportunity and the first uplink transmission opportunity are neighboring in time domain. In this example, the first uplink transmission opportunity configured for the first resource and the second uplink transmission opportunity configured for the second resource may be located in a same frequency band in frequency domain, that is, at a same frequency domain position (for example, as shown in FIG. 6), or may be located in different frequency bands, that is, at different frequency domain positions (for example, as shown in FIG. 5).

Figure 7:
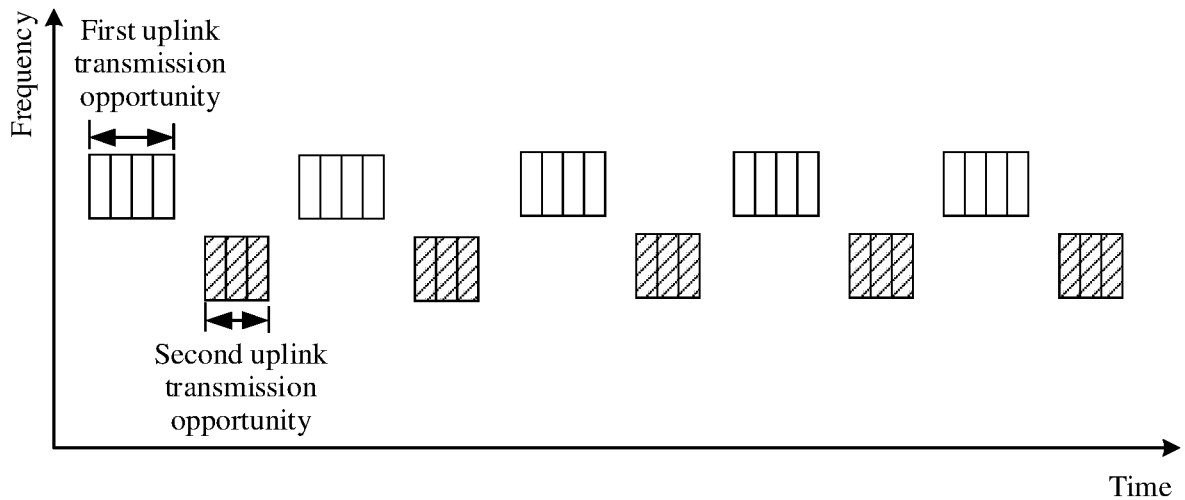
FIG. 7 is still another schematic diagram of resource distribution with the at least one first uplink transmission opportunity and the first uplink transmission opportunity not neighboring in the time domain and with different frequencies according to an embodiment of this application.
Figure 8:
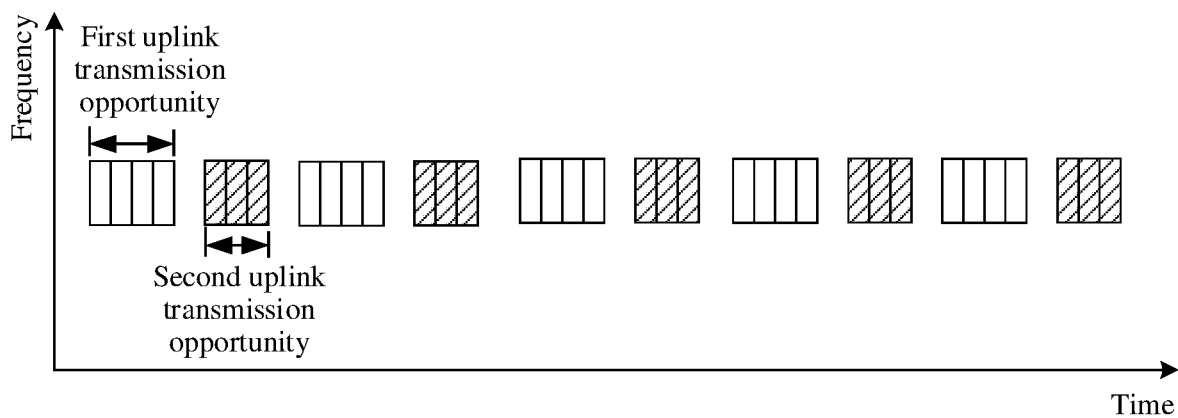
FIG. 8 is still another schematic diagram of resource distribution with the at least one first uplink transmission opportunity and the first uplink transmission opportunity not neighboring in the time domain and with the same frequency according to an embodiment of this application.

FIG. 7 is still another schematic diagram of resource distribution according to an embodiment of this application, and FIG. 8 is still another schematic diagram of resource distribution according to an embodiment of this application. A relationship between the first uplink transmission opportunity configured for the first resource and the second uplink transmission opportunity configured for the second resource in time domain may be shown in FIG. 7 and FIG. 8. That is, a second uplink transmission opportunity after one of the at least one first uplink transmission opportunity and the first uplink transmission opportunity are not neighboring in time domain. In this example, the first uplink transmission opportunity configured for the first resource and the second uplink transmission opportunity configured for the second resource may be located in a same frequency band in frequency domain, that is, at a same frequency domain position (for example, as shown in FIG. 8), or may be located in different frequency bands, that is, at different frequency domain positions (for example, as shown in FIG. 7).

Figure 9:
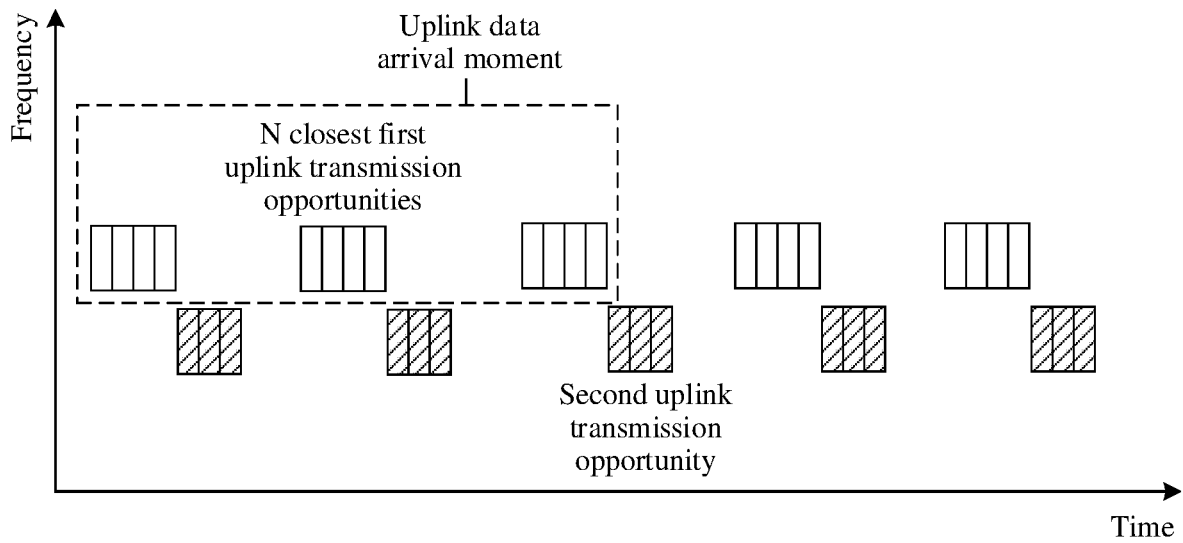
FIG. 9 is a schematic diagram of data transmission illustrating N closest first uplink transmission opportunities according to an embodiment of this application.

FIG. 9 is a schematic diagram of data transmission according to an embodiment of this application. As shown in FIG. 9, for ease of description of this embodiment of this application, in this embodiment of this application, one second uplink transmission opportunity configured for the second resource is used as an example for description. The second uplink transmission opportunity may be, for example, the $1^{st}$ second uplink transmission opportunity after a moment at which uplink data arrives at the terminal device, namely, the second uplink transmission opportunity marked in FIG. 9. In this embodiment, when the terminal device needs to send the uplink data, the terminal device may determine whether sending using N closest first uplink transmission opportunities before the second uplink transmission opportunity is blocked. If sending using the N first uplink transmission opportunities is blocked, it indicates that sending of the uplink data is affected because sending on the first resource used as the primary resource is blocked. Therefore, the terminal device may directly send the uplink data by using the second uplink transmission opportunity of the second resource used as the secondary resource. That is, when sending on the primary resource is blocked, the terminal device may send the uplink data by using the secondary resource as soon as possible. In this manner, a latency of transmitting the uplink data can be ensured, and a relatively large latency that is of transmitting the uplink data and that is because sending is blocked is avoided.

When a relationship between the first uplink transmission opportunity configured for the first resource and the second uplink transmission opportunity configured for the second resource in time domain may be shown in FIG. 5 and FIG. 6, that is, when a second uplink transmission opportunity after one of the at least one first uplink transmission opportunity and the first uplink transmission opportunity are neighboring in time domain, when sending on the first resource used as the primary resource is blocked, the terminal device may immediately send the uplink data by using the second uplink transmission opportunity configured for the second resource, so that the latency of transmitting the uplink data is further shortened.

It should be understood that the N closest first uplink transmission opportunities herein are a part of the at least one first uplink transmission opportunity configured for the first resource, and the N first uplink transmission opportunities may be N consecutive first uplink transmission opportunities. A value of N is not limited in this embodiment. FIG. 9 is a schematic diagram of an example in which N is 3. In a possible implementation, N may be preset. For example, the value of N may be predefined in a protocol. Alternatively, N may be sent by the network device to the terminal device by using indication information. For example, the network device sends second indication information to the terminal device, where the second indication information indicates N. Correspondingly, the terminal device receives the second indication information, and obtains N by using the second indication information. Optionally, the second indication information may be carried in higher layer signaling or physical layer signaling. In other words, the higher layer signaling or the physical layer signaling indicates N.

If sending using at least one of the N closest first uplink transmission opportunities before the second uplink transmission opportunity is unblocked, it indicates that an excessively large latency that is of sending the uplink data and that is because sending on the first resource used as the primary resource is blocked may not exist. In this case, the terminal device determines that the second uplink transmission opportunity cannot be used to send the uplink data. That is, the terminal device determines not to use the second resource. In this scenario, the terminal device may send the uplink data by using, for example, the $1^{st}$ first uplink transmission opportunity after the moment at which the uplink data arrives at the terminal device.

Correspondingly, the network device may determine, in the foregoing manner, whether sending using N closest first uplink transmission opportunities before each second uplink transmission opportunity of the second resource is blocked. If sending using the N first uplink transmission opportunities is blocked, the network device monitors, on the second uplink transmission opportunity, whether there is the uplink data from the terminal device. If sending using the N first uplink transmission opportunities is unblocked, the network device determines that the second uplink transmission opportunity cannot be used to send the uplink data. In this case, the network device may continue to monitor, on the first uplink transmission opportunity, whether there is the uplink data from the terminal device. In this scenario, the network device may temporarily schedule the second resource to another terminal device for use. In other words, when sending of the uplink data is not affected by that sending on the first resource is blocked, the second resource may be temporarily scheduled by the network device to the another terminal device for use. In this manner, scheduling flexibility of the network device can be ensured, monitoring complexity of the network device can be reduced, and uplink resource overheads can be reduced.

Figure 10:
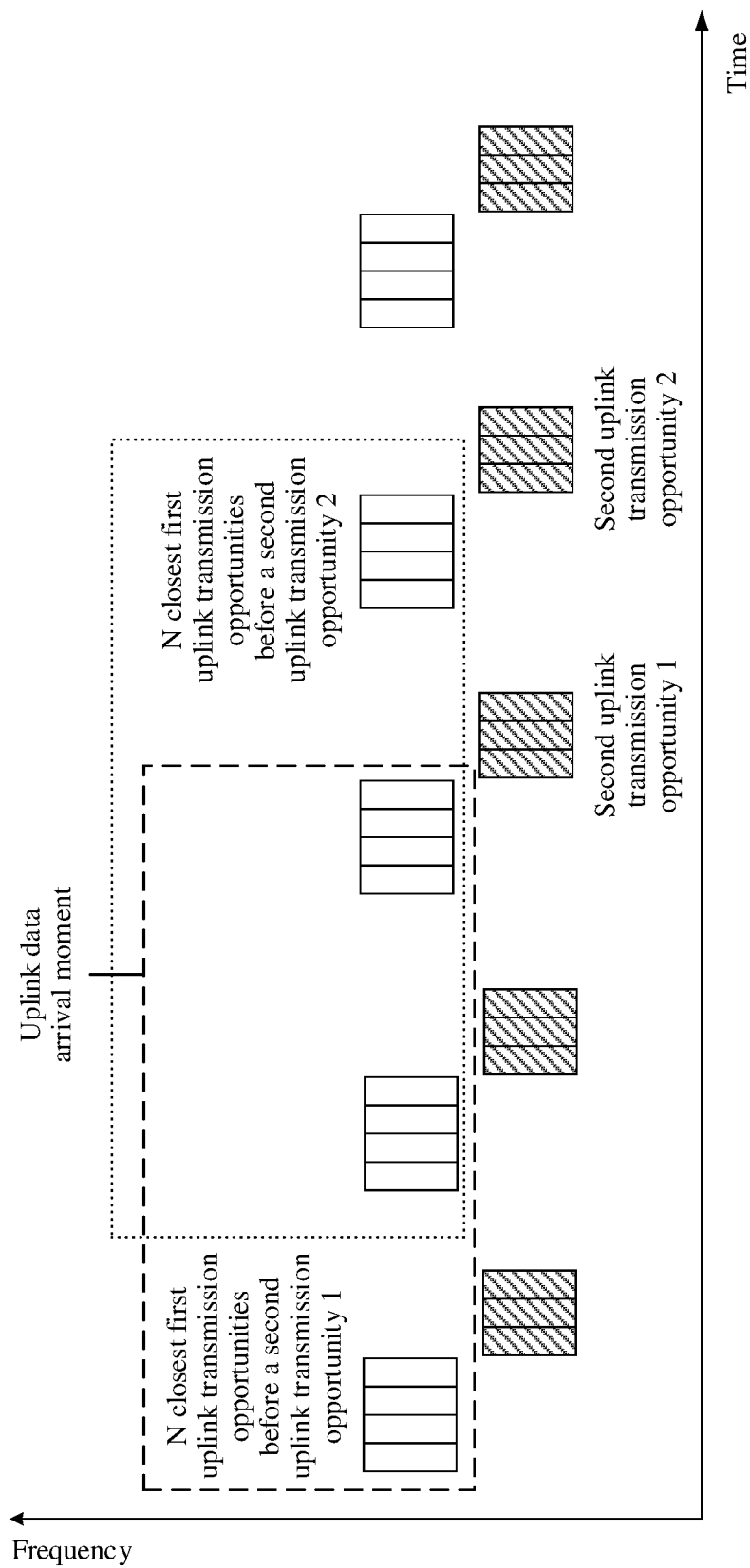
FIG. 10 is another schematic diagram of data transmission illustrating N closest first uplink transmission opportunities before first and second instances of second uplink transmission opportunities according to an embodiment of this application.

FIG. 10 is another schematic diagram of data transmission according to an embodiment of this application. As shown in FIG. 10, in this embodiment, two second uplink transmission opportunities (a second uplink transmission opportunity 1 and a second uplink transmission opportunity 2) configured for the second resource are used as an example for description. It is assumed that N is equal to 3. In this embodiment, when the terminal device needs to send the uplink data, the terminal device determines, in the foregoing manner, that sending using N closest first uplink transmission opportunities before the second uplink transmission opportunity 1 is blocked and sending using N closest first uplink transmission opportunities before the second uplink transmission opportunity 2 is also blocked. In this scenario, if the second uplink transmission opportunity 1 may be used to send the uplink data, the second uplink transmission opportunity 2 cannot be used to send the uplink data. In other words, when sending using N closest first uplink transmission opportunities before a second uplink transmission opportunity is blocked, whether there is still an available second uplink transmission opportunity between the N closest first uplink transmission opportunities and the second uplink transmission opportunity further needs to be observed. If yes, the second uplink transmission opportunity this time cannot be used to send the uplink data. If no, the second uplink transmission opportunity this time may be used to send the uplink data.

The following describes in detail how to determine that sending using a first uplink transmission opportunity is blocked. For example, the following two manners may be included.

Manner 1: When sending on each of X repeated first uplink transmission resources in the first uplink transmission opportunity is blocked, it is determined that sending on the first uplink transmission opportunity is blocked.

When sending on each of uplink transmission resources in the first uplink transmission opportunity is blocked, that is, when any uplink transmission resource in the first uplink transmission opportunity cannot be used to send uplink data, a terminal device may determine that sending using the first uplink transmission opportunity is blocked. On the contrary, when sending on at least one first uplink transmission resource in the first uplink transmission opportunity is unblocked, that is, when at least one uplink transmission resource in the first uplink transmission opportunity may be used to send the uplink data, the terminal device may determine that sending using the first uplink transmission opportunity is unblocked.

In this embodiment, that sending on a first uplink transmission resource is blocked may be that at least one symbol in the first uplink transmission resource is a non-uplink symbol. For example, the at least one symbol is configured as a downlink symbol or a flexible symbol. For details, refer to the foregoing descriptions of Scenario 1, Scenario 2, Scenario 3, and Scenario 5 in which sending is blocked.

Alternatively, that sending on a first uplink transmission resource is blocked may be that at least one symbol in the first uplink transmission resource is a symbol on which sending of a PUSCH cannot be canceled in time. That is, the terminal device sends the uplink data by using at least one non-uplink symbol in the first uplink transmission resource. For details, refer to the foregoing descriptions of Scenario 2 and Scenario 3 in which sending is blocked.

It should be noted that, in this embodiment, for the foregoing descriptions of Scenario 4 in which sending is blocked (that is, a scenario in which the terminal device is configured to monitor the DCI used to perform the SFI, but does not detect the DCI, and therefore sending on the uplink transmission resource is blocked), if the terminal device determines, based on the scenario, that sending using the N closest first uplink transmission opportunities before a second uplink transmission opportunity is blocked, the second resource is not enabled. That is, the terminal device does not send the uplink data by using the second uplink transmission opportunity, but sends the uplink data by using a subsequent first uplink transmission opportunity using which sending is unblocked. This is because the network device cannot learn that the terminal device does not detect the DCI. Therefore, the network device cannot determine, based on the scenario, whether sending using the N closest first uplink transmission opportunities before the second uplink transmission opportunity is blocked. Therefore, the network device still monitors, on the first resource, whether there is the uplink data from the terminal device. Therefore, in this scenario, to ensure data transmission reliability, the terminal device still sends the uplink data by using the first resource.

Manner 2: When a quantity of first uplink transmission resources on which sending is blocked and that are in the first uplink transmission opportunity is greater than or equal to a first preset threshold, it is determined that sending using the first uplink transmission opportunity is blocked. The first preset threshold may be less than or equal to a quantity X of first uplink transmission resources included in the first uplink transmission opportunity. For a manner of determining that sending on the first uplink transmission resource is blocked, refer to the descriptions in Manner 1.

For example, the first preset threshold is less than X. When the quantity of first uplink transmission resources on which sending is blocked and that are in the first uplink transmission opportunity is greater than or equal to the first preset threshold, it is determined that sending using the first uplink transmission opportunity is blocked. Otherwise, it is determined that sending using the first uplink transmission opportunity is unblocked. For example, the first preset threshold is equal to X. When the quantity of first uplink transmission resources on which sending is blocked and that are in the first uplink transmission opportunity is equal to the first preset threshold, it is determined that sending using the first uplink transmission opportunity is blocked. Otherwise, it is determined that sending using the first uplink transmission opportunity is unblocked.

A value of the first preset threshold is not limited in this embodiment. In a possible implementation, the first preset threshold may be preset. For example, the value of the first preset threshold may be predefined in a protocol. Alternatively, the first preset threshold may be sent by the network device to the terminal device by using indication information. For example, the network device sends first indication information to the terminal device, where the first indication information indicates the first preset threshold. Correspondingly, the terminal device receives the first indication information, and obtains the first preset threshold by using the first indication information. Optionally, the first indication information may be carried in higher layer signaling or physical layer signaling. In other words, the higher layer signaling or the physical layer signaling indicates the first preset threshold.

In another possible implementation, the first preset threshold may be determined based on a first configuration parameter and/or a second configuration parameter of the first resource, where the first configuration parameter is used to configure X, and the second configuration parameter is used to configure redundancy versions of uplink data allowed to be transmitted on the first uplink transmission resources in the first uplink transmission opportunity. For example, the first configuration parameter may be repK, and the second configuration parameter may be, for example, repK-RV.

For example, a relationship between the first preset threshold and repK and/or repK-RV may be shown in the following Table 3.

TABLE 3

| repK-RV | First preset threshold |
| --- | --- |
| Not configured | 1 |
| {0, 2, 3, 1} | K |
| {0, 3, 0, 3} | 2 |
| {0, 0, 0, 0} | If K is not equal to 8, the first preset threshold is equal to 1, if K is equal to 8, the first preset threshold is equal to 2 |

Whether the first uplink transmission opportunity is blocked can be identified in any one of the foregoing manners. Further, when sending using the N closest first uplink transmission opportunities before the second uplink transmission opportunity is blocked, the terminal device may directly send uplink data by using the second uplink transmission opportunity in the second resource used as the secondary resource, to send the uplink data by using the secondary resource as soon as possible. In this manner, the latency of transmitting the uplink data can be ensured, and the relatively large latency that is of transmitting the uplink data and that is because sending is blocked is avoided.

The first resource and the second resource in this embodiment of this application may be preset for the terminal device, or may be configured by the network device for the terminal device by using higher layer signaling or physical layer signaling. For example, in a possible implementation, that a terminal device obtains a first resource and a second resource may be that the network device sends higher layer signaling to the terminal device, where the higher layer signaling indicates the first resource and the second resource. Correspondingly, the terminal device obtains the first resource and the second resource by receiving the higher layer signaling. It should be understood that the higher layer signaling herein may be, for example, RRC signaling.

The following uses the higher layer signaling as an example. It is assumed that both the first resource and the second resource are the CG resources. How the network device configures the first resource and the second resource for the terminal device by using the higher layer signaling is described.

Case 1: Both the first resource and the second resource are the type-1 CG resources.

In this example, the higher layer signaling may include a first information field and a second information field. The first information field corresponds to the first resource, and the second information field corresponds to the second resource. It should be understood that whether the higher layer signaling includes another information field or parameter is not limited in this embodiment of this application.

The first information field includes a first information subfield and/or a second information subfield. The first information subfield indicates time-frequency information of the first resource. For example, the first information subfield may include at least one parameter in the time domain offset (namely, timeDomainOffset), time domain resource assignment (namely, timeDomainAllocation), and frequency domain resource assignment (namely, frequencyDomainAllocation) shown in Table 1, to indicate the time-frequency information of the first resource by using the at least one parameter. The second information subfield indicates a transmission parameter of the first resource. The transmission parameter of the first resource may include at least one of the following: X, the redundancy versions (for example, repK-RV shown in Table 1) of the uplink data allowed to be transmitted on the first uplink transmission resources in the first uplink transmission opportunity, and a time interval (for example, the periodicity P shown in Table 1) between two neighboring first uplink transmission opportunities. For example, the second information subfield may indicate the transmission parameter of the first resource by including the at least one parameter. It should be understood that a parameter that is not indicated by the first information field and that is related to configuring the first resource may be indicated in another position in the higher layer signaling, may be indicated by using other signaling, or may be a preset value.

The second information field includes a third information subfield and/or a fourth information subfield. The third information subfield indicates time-frequency information of the second resource. For example, the third information subfield may include at least one parameter in the time domain offset (namely, timeDomainOffset), time domain resource assignment (namely, timeDomainAllocation), and frequency domain resource assignment (namely, frequencyDomainAllocation) shown in Table 1, to indicate the time-frequency information of the second resource by using the at least one parameter. The fourth information subfield indicates a transmission parameter of the second resource. The transmission parameter of the second resource includes at least one of the following: Y, redundancy versions (namely, repK-RV shown in Table 1) of uplink data allowed to be transmitted on the second uplink transmission resources in the second uplink transmission opportunity, and a time interval (for example, the periodicity P shown in Table 1) between two neighboring second uplink transmission opportunities. For example, the fourth information subfield may indicate the transmission parameter of the second resource by including the at least one parameter. It should be understood that a parameter that is not indicated by the second information field and that is related to configuring the second resource may be indicated in another position in the higher layer signaling, may be indicated by using other signaling, or may be a preset value.

In a possible implementation, any information subfield in the first information subfield, the second information subfield, the third information subfield, and the fourth information subfield may be packaged into one IE in the higher layer signaling. Certainly, a name of the IE is not limited in this embodiment of this application. For example, these IEs are located in IE ConfiguredGrantConfig of the higher layer signaling. In other words, the first information field and the second information field are located in IE ConfiguredGrantConfig of the higher layer signaling.

In a possible implementation, the first information subfield and/or the second information subfield further indicate/indicates a type of the first resource, and/or the third information subfield and/or the fourth information subfield further indicate/indicates a type of the second resource. The type of the first resource and the type of the second resource are used to distinguish a resource corresponding to an information subfield. For example, a resource type parameter may be carried in the information subfield to indicate a type of the resource. For example, when a value of the type parameter is 1, it indicates that the resource is the first resource, or when a value of the type parameter is 0, it indicates that the resource is the second resource. Alternatively, when a value of the type parameter is 0, it indicates that the resource is the first resource, or when a value of the type parameter is 1, it indicates that the resource is the second resource.

In a possible implementation, a plurality of groups of resources are configured for the terminal device, where each group of resources includes one first resource and a second resource corresponding to the first resource. In this scenario, the first information subfield and/or the second information subfield further indicate/indicates an identifier of a group to which the first resource belongs, and the third information subfield and/or the fourth information subfield further indicate/indicates an identifier of a group to which the second resource belongs. For example, a group identifier may be carried in the information subfield. The group identifier herein may be, for example, an ID of a group or an index of the group. It should be understood that, when the information subfield is used to indicate a first resource and a second resource that belong to a same group, an information subfield corresponding to one of the resources may indicate a type of a resource indicated by the information subfield, so that a resource indicated by an information subfield that does not indicate a type of a resource can be distinguished by using the group identifier and the type of the resource. In this manner, signaling overheads can be reduced on the basis of distinguishing two types of resources.

Case 2: Both the first resource and the second resource are the type-2 CG resources.

In this example, the higher layer signaling may include a first information field and a second information field. The first information field corresponds to the first resource, and the second information field corresponds to the second resource. It should be understood that whether the higher layer signaling includes another information field or parameter is not limited in this embodiment of this application.

The first information field includes a first information subfield and/or a second information subfield. For descriptions of the first information subfield and the second information subfield, refer to descriptions in Case 1. Details are not described herein again. A parameter that is not indicated by the first information field and that is related to configuring the first resource may be indicated in another position in the higher layer signaling, may be indicated by using other signaling, or may be a preset value.

The second information field includes a third information subfield and/or a fourth information subfield. For descriptions of the third information subfield and the fourth information subfield, refer to descriptions in Case 1. Details are not described herein again. It should be understood that a parameter that is not indicated by the second information field and that is related to configuring the second resource may be indicated in another position in the higher layer signaling, may be indicated by using other signaling, or may be a preset value.

In a possible implementation, any information subfield in the first information subfield, the second information subfield, the third information subfield, and the fourth information subfield may be packaged into one IE in the higher layer signaling. Certainly, a name of the IE is not limited in this embodiment of this application. For example, these IEs are located in IE ConfiguredGrantConfig of the higher layer signaling. In other words, the first information field and the second information field are located in IE ConfiguredGrantConfig of the higher layer signaling.

As described above, for the type-2 CG, the network device may indicate, by using that IE configuredGrantConfig in the RRC signaling does not include an rrc-ConfiguredUplinkGrant parameter, that a CG resource configured by using the higher layer signaling is the type-2 CG resource. In other words, in this embodiment of this application, if the first resource and the second resource are the type-2 CG resources, the higher layer signaling indicates, by using that IE configuredGrantConfig does not include the rrc-ConfiguredUplinkGrant parameter, that the CG resource configured by using the higher layer signaling is the type-2 CG resource.

Correspondingly, after the first resource and the second resource are configured for the terminal device, the network device may activate or deactivate the first resource by using DCI at a physical layer, and activate or deactivate the second resource by using the DCI. In some embodiments, the higher layer signaling does not carry the first information subfield and/or the third information subfield. That is, the higher layer signaling in this embodiment of this application retains a same manner as existing higher layer signaling, and only a transmission parameter of the first resource and/or a transmission parameter of the second resource are/is indicated in the higher layer signaling. In this way, when the network device activates or deactivates a resource by using DCI, time-frequency information of the resource is further indicated by using the DCI. For example, the first resource is activated. The DCI may carry the first information subfield to indicate the first resource.

In a possible implementation, the DCI may further separately indicate a type of the activated or deactivated resource, so that the terminal device learns of the activated or deactivated resource, the first information subfield and/or the second information subfield further indicate/indicates a type of the first resource, and/or the third information subfield and/or the fourth information subfield further indicate/indicates a type of the second resource. For descriptions of the type, refer to the descriptions in Case 1. Details are not described herein again.

In a possible implementation, a plurality of groups of resources are configured for the terminal device, where each group of resources includes one first resource and a second resource corresponding to the first resource. In this scenario, control information further indicates an identifier of a group to which the activated or deactivated resource belongs. Correspondingly, the first information subfield and/or the second information subfield further indicate/indicates an identifier of a group to which the first resource belongs. The third information subfield and/or the fourth information subfield further indicate/indicates an identifier of a group to which the second resource belongs. For descriptions of the identifier of the group, refer to the descriptions in Case 1. Details are not described herein again. It should be understood that, when the control information is used to indicate the identifier of the group to which the activated or deactivated resource belongs, the type of the resource may be indicated only by using the control information or only by using an information subfield for indicating the resource. In this manner, signaling overheads can be reduced on the basis of distinguishing two types of resources.

It should be understood that the foregoing two cases are merely examples. When the first resource is the type-1 CG resource and the second resource is the type-2 CG resource, the first resource may be indicated in the manner shown in Case 1, and the second resource may be indicated in the manner shown in Case 2. Correspondingly, when the first resource is the type-2 CG resource and the second resource is the type-1 CG resource, the first resource may be indicated in the manner shown in Case 2, and the second resource may be indicated in the manner shown in Case 1. Details are not described again.

In the foregoing manner, the network device may configure the first resource used as the primary resource and the second resource used as the secondary resource for the terminal device, so that when the first resource used as the primary resource encounters a scenario in which sending of the PUSCH is blocked, the terminal device may send the uplink data by using the second resource used as the secondary resource, to ensure a latency of the uplink data. Correspondingly, if the first resource does not encounter the scenario in which sending of the PUSCH is blocked, the network device may schedule the second resource to the another terminal device for use. When uplink data of a URLLC service is transmitted in this manner, a latency of transmitting the uplink data of the URLLC service can be reduced without affecting scheduling flexibility, monitoring complexity, and uplink resource overheads of the network device.

According to the data transmission method provided in this embodiment of this application, the first resource used as the primary resource and the second resource used as the secondary resource are configured for the terminal device, so that when the first resource used as the primary resource encounters the scenario in which sending of the PUSCH is blocked, the terminal device may send the uplink data by using the second resource used as the secondary resource, to ensure the latency of the uplink data. Correspondingly, if the first resource does not encounter the scenario in which sending of the PUSCH is blocked, the network device may schedule the second resource to the another terminal device for use. When the uplink data of the URLLC service is transmitted in this manner, the latency of transmitting the uplink data of the URLLC service can be reduced without affecting scheduling flexibility, monitoring complexity, and uplink resource overheads of the network device.

Figure 11:
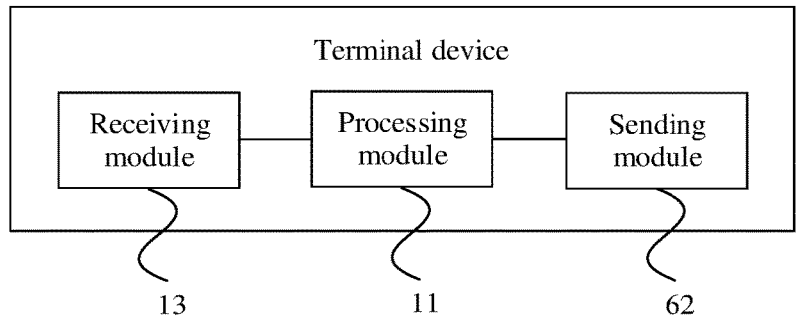
FIG. 11 is a schematic diagram of a structure of a terminal device according to an embodiment of this application.

FIG. 11 is a schematic diagram of a structure of a terminal device according to an embodiment of this application. As shown in FIG. 11, the terminal device includes a processing module 11 and a sending module 12. In some embodiments, the terminal device may further include a receiving module 13.

The processing module 11 is configured to obtain a first resource and a second resource, where at least one first uplink transmission opportunity is configured for the first resource, a second uplink transmission opportunity is configured for the second resource, the first uplink transmission opportunity includes X repeated first uplink transmission resources, the second uplink transmission opportunity includes Y repeated second uplink transmission resources, and both X and Y are integers greater than or equal to 1.

The sending module 12 is configured to send uplink data to a network device by using the second uplink transmission opportunity when sending using N closest first uplink transmission opportunities before the second uplink transmission opportunity is blocked, where N is an integer greater than or equal to 1. For example, N is preset. Alternatively, the receiving module 13 is configured to receive second indication information from the network device, where the second indication information indicates N.

In a possible implementation, the processing module 11 is further configured to when sending using at least one of the N closest first uplink transmission opportunities before the second uplink transmission opportunity is unblocked, determine that the second uplink transmission opportunity cannot be used to send the uplink data.

In a possible implementation, for example, that sending using the first uplink transmission opportunity is blocked may include sending on each of the X repeated first uplink transmission resources in the first uplink transmission opportunity is blocked, or a quantity of first uplink transmission resources on which sending is blocked and that are in the first uplink transmission opportunity is greater than or equal to a first preset threshold, where the first preset threshold is less than or equal to X. For example, that sending on the first uplink transmission resource is blocked may include at least one symbol in the first uplink transmission resource is a non-uplink symbol, or the terminal device sends the uplink data by using at least one non-uplink symbol in the first uplink transmission resource. In a possible implementation, the first preset threshold is preset, or the first preset threshold is determined based on a first configuration parameter and/or a second configuration parameter of the first resource, where the first configuration parameter is used to configure X, and the second configuration parameter is used to configure redundancy versions of uplink data allowed to be transmitted on the first uplink transmission resources in the first uplink transmission opportunity. Alternatively, the receiving module 13 is configured to receive first indication information from the network device, where the first indication information indicates the first preset threshold.

In a possible implementation, a second uplink transmission opportunity after one of the at least one first uplink transmission opportunity and the first uplink transmission opportunity are neighboring in time domain, or a second uplink transmission opportunity after one of the at least one first uplink transmission opportunity and the first uplink transmission opportunity are neighboring in time domain, and have a same frequency domain position.

The first resource and the second resource in this embodiment of this application may be preset for the terminal device, or may be configured by the network device for the terminal device by using higher layer signaling or physical layer signaling. The higher layer signaling is used as an example. The processing module 11 is specifically configured to receive higher layer signaling from the network device by using the receiving module. The higher layer signaling indicates the first resource and the second resource. The higher layer signaling includes a first information field and a second information field.

The first information field includes a first information subfield and/or a second information subfield. The first information subfield indicates time-frequency information of the first resource, and the second information subfield indicates a transmission parameter corresponding to the first resource. The transmission parameter of the first resource includes at least one of the following: X, the redundancy versions of the uplink data allowed to be transmitted on the first uplink transmission resources in the first uplink transmission opportunity, and a time interval between two neighboring first uplink transmission opportunities.

The second information field includes a third information subfield and/or a fourth information subfield. The third information subfield indicates time-frequency information of the second resource, and the fourth information subfield indicates a transmission parameter corresponding to the second resource. The transmission parameter of the second resource includes at least one of the following: Y, redundancy versions of uplink data allowed to be transmitted on the second uplink transmission resources in the second uplink transmission opportunity, and a time interval between two neighboring second uplink transmission opportunities.

In a possible implementation, if a plurality of groups of resources are configured for the terminal device, where each group of resources includes one first resource and a second resource corresponding to the first resource, the first information subfield and/or the second information subfield further indicate/indicates an identifier of a group to which the first resource belongs, and the third information subfield and/or the fourth information subfield further indicate/indicates an identifier of a group to which the second resource belongs.

In a possible implementation, the first information subfield and/or the second information subfield further indicate/indicates a type of the first resource, and/or the third information subfield and/or the fourth information subfield further indicate/indicates a type of the second resource.

In a possible implementation, if a resource configuration information element of the higher layer signaling does not include a radio resource control configured uplink grant parameter, the receiving module 13 is further configured to receive control information from the network device, where the control information is used to activate or deactivate a resource.

In this implementation, optionally, the control information further indicates a type of the activated or deactivated resource, the first information subfield and/or the second information subfield further indicate/indicates a type of the first resource, and/or the third information subfield and/or the fourth information subfield further indicate/indicates a type of the second resource.

In this implementation, optionally, if a plurality of groups of resources are configured for the terminal device, where each group of grant resources includes one first resource and a second resource corresponding to the first resource, the control information further indicates an identifier of a group to which the activated or deactivated resource belongs.

The terminal device provided in this embodiment of this application may perform the actions of the terminal device in the foregoing method embodiment. An implementation principle and a technical effect of this embodiment are similar to those of the foregoing method embodiment. Details are not described herein again.

Figure 12:
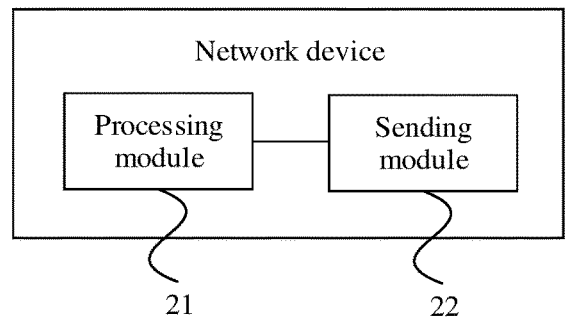
FIG. 12 is a schematic diagram of a structure of a network device according to an embodiment of this application.

FIG. 12 is a schematic diagram of a structure of a network device according to an embodiment of this application. As shown in FIG. 12, the network device includes a processing module 21. In some embodiments, the network device may further include a sending module 22.

The processing module 21 is configured to obtain a first resource and a second resource that are configured for a terminal device, where at least one first uplink transmission opportunity is configured for the first resource, a second uplink transmission opportunity is configured for the second resource, the first uplink transmission opportunity includes X repeated first uplink transmission resources, the second uplink transmission opportunity includes Y repeated second uplink transmission resources, both X and Y are integers greater than or equal to 1, and N is an integer greater than or equal to 1.

In this scenario, the processing module 21 monitors, on the second uplink transmission opportunity, uplink data from the terminal device when sending using N closest first uplink transmission opportunities before the second uplink transmission opportunity is blocked.

In a possible implementation, the processing module 21 is further configured to when sending using at least one of the N closest first uplink transmission opportunities before the second uplink transmission opportunity is unblocked, determine that the second uplink transmission opportunity cannot be used to send the uplink data. For example, N is preset. Alternatively, the sending module 22 is configured to send second indication information to the terminal device, where the second indication information indicates N.

In a possible implementation, for example, that sending using the first uplink transmission opportunity is blocked may include sending on each of the X repeated first uplink transmission resources in the first uplink transmission opportunity is blocked, or a quantity of first uplink transmission resources on which sending is blocked and that are in the first uplink transmission opportunity is greater than or equal to a first preset threshold, where the first preset threshold is less than or equal to X. For example, that sending on the first uplink transmission resource is blocked may include at least one symbol in the first uplink transmission resource is a non-uplink symbol, or the terminal device sends the uplink data by using at least one non-uplink symbol in the first uplink transmission resource. In a possible implementation, the first preset threshold is preset, or the first preset threshold is determined based on a first configuration parameter and/or a second configuration parameter of the first resource, where the first configuration parameter is used to configure X, and the second configuration parameter is used to configure redundancy versions of uplink data allowed to be transmitted on the first uplink transmission resources in the first uplink transmission opportunity. Alternatively, the sending module 22 is configured to send first indication information to the terminal device, where the first indication information indicates the first preset threshold.

In a possible implementation, a second uplink transmission opportunity after one of the at least one first uplink transmission opportunity and the first uplink transmission opportunity are neighboring in time domain, or a second uplink transmission opportunity after one of the at least one first uplink transmission opportunity and the first uplink transmission opportunity are neighboring in time domain, and have a same frequency domain position.

The first resource and the second resource in this embodiment of this application may be preset for the terminal device, or may be configured by the network device for the terminal device by using higher layer signaling or physical layer signaling. The higher layer signaling is used as an example. The sending module 22 is configured to send higher layer signaling to the terminal device. The higher layer signaling indicates the first resource and the second resource. The higher layer signaling includes a first information field and a second information field.

The first information field includes a first information subfield and/or a second information subfield. The first information subfield indicates time-frequency information of the first resource, and the second information subfield indicates a transmission parameter corresponding to the first resource. The transmission parameter of the first resource includes at least one of the following: X, the redundancy versions of the uplink data allowed to be transmitted on the first uplink transmission resources in the first uplink transmission opportunity, and a time interval between two neighboring first uplink transmission opportunities.

The second information field includes a third information subfield and/or a fourth information subfield. The third information subfield indicates time-frequency information of the second resource, and the fourth information subfield indicates a transmission parameter corresponding to the second resource. The transmission parameter of the second resource includes at least one of the following: Y, redundancy versions of uplink data allowed to be transmitted on the second uplink transmission resources in the second uplink transmission opportunity, and a time interval between two neighboring second uplink transmission opportunities.

In a possible implementation, if a plurality of groups of resources are configured for the terminal device, where each group of resources includes one first resource and a second resource corresponding to the first resource, the first information subfield and/or the second information subfield further indicate/indicates an identifier of a group to which the first resource belongs, and the third information subfield and/or the fourth information subfield further indicate/indicates an identifier of a group to which the second resource belongs.

In a possible implementation, the first information subfield and/or the second information subfield further indicate/indicates a type of the first resource, and/or the third information subfield and/or the fourth information subfield further indicate/indicates a type of the second resource.

In a possible implementation, if a resource configuration information element of the higher layer signaling does not include a radio resource control configured uplink grant parameter, the sending module 22 is further configured to send control information to the terminal device, where the control information is used to activate or deactivate a resource.

In this implementation, optionally, the control information further indicates a type of the activated or deactivated resource, the first information subfield and/or the second information subfield further indicate/indicates a type of the first resource, and/or the third information subfield and/or the fourth information subfield further indicate/indicates a type of the second resource.

In this implementation, optionally, if a plurality of groups of resources are configured for the terminal device, where each group of grant resources includes one first resource and a second resource corresponding to the first resource, the control information further indicates an identifier of a group to which the activated or deactivated resource belongs.

The network device provided in this embodiment of this application may perform the actions of the network device in the foregoing method embodiment. An implementation principle and a technical effect of this embodiment are similar to those of the foregoing method embodiment. Details are not described herein again.

It should be noted that, it should be understood that the foregoing receiving module may be a receiver or a communication interface during actual implementation, and the sending module may be a transmitter or a communication interface during actual implementation. The processing module may be implemented in a form of software invoked by a processing element, or implemented in a form of hardware. For example, the processing module may be a separately disposed processing element, or may be integrated into a chip of the foregoing apparatus for implementation. In addition, the processing module may be stored in a memory of the foregoing apparatus in a form of program code, and is invoked by a processing element of the foregoing apparatus to perform a function of the processing module. In addition, all or some of the modules may be integrated, or may be implemented independently. The processing element herein may be an integrated circuit and has a signal processing capability. In an implementation process, steps in the foregoing methods or the foregoing modules may be completed by using a hardware integrated logical circuit in the processor element, or by using instructions in a form of software.

For example, the foregoing modules may be configured as one or more integrated circuits for implementing the method, such as one or more application specific integrated circuits (ASIC), one or more microprocessors (DSP), or one or more field programmable gate arrays (FPGA). For another example, when one of the foregoing modules is implemented in a form of scheduling program code by a processing element, the processing element may be a general-purpose processor, for example, a central processing unit (CPU) or another processor that can invoke the program code. For another example, the modules may be integrated together, and are implemented in a form of a system-on-a-chip (SOC).

Figure 13:
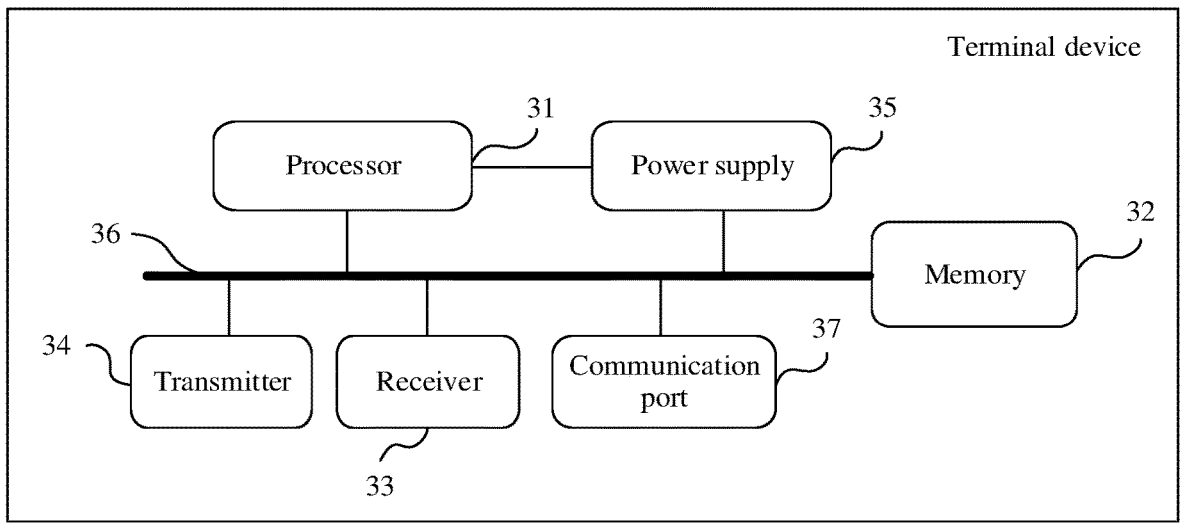
FIG. 13 is a schematic diagram of a structure of another terminal device according to an embodiment of this application.

FIG. 13 is a schematic diagram of a structure of another terminal device according to an embodiment of this application. As shown in FIG. 13, the terminal device may include a processor 31 (for example, a CPU), a memory 32, a receiver 33, and a transmitter 34. Both the receiver 33 and the transmitter 34 are coupled to the processor 31, the processor 31 controls a receiving action of the receiver 33, and the processor 31 controls a sending action of the transmitter 34. The memory 32 may include a high-speed random-access memory (RAM), or may further include a non-volatile memory (NVM), for example, at least one magnetic disk storage. The memory 32 may store various instructions to complete various processing functions and implement method steps in this application. Optionally, the terminal device in this application may further include a power supply 35, a communication bus 36, and a communication port 37. The receiver 33 and the transmitter 34 may be integrated into a transceiver of the terminal device, or may be independent transceiver antennas of the terminal device. The communication bus 36 is configured to implement communication connection between components. The communication port 37 is configured to implement a connection and communication between the terminal device and another peripheral.

In this embodiment of this application, the memory 32 is configured to store computer executable program code. The program code includes instructions. When the processor 31 executes the instructions, the terminal device is enabled to perform the actions of the terminal device in the foregoing method embodiment. An implementation principle and a technical effect of this embodiment are similar to those of the foregoing method embodiment. Details are not described herein again.

Figure 14:
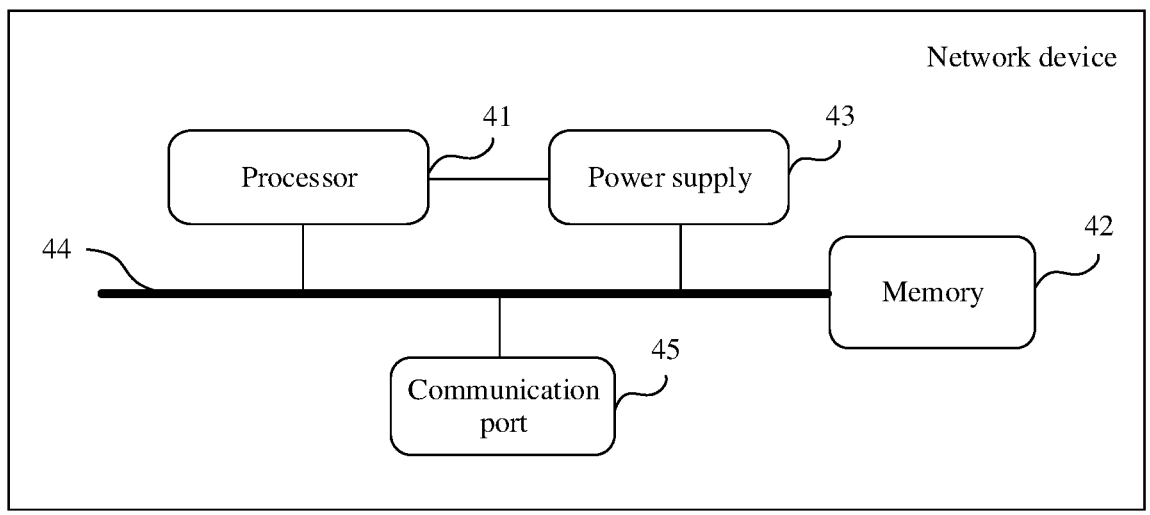
FIG. 14 is a schematic diagram of a structure of another network device according to an embodiment of this application.

FIG. 14 is a schematic diagram of a structure of another network device according to an embodiment of this application. As shown in FIG. 14, the network device may include a processor 41 (for example, a CPU) and a memory 42. The memory 42 may include a high-speed random-access memory (RAM), or may further include a nonvolatile memory (NVM), for example, at least one magnetic disk storage. The memory 42 may store various instructions, to complete various processing functions and implement method steps in this application. Optionally, the network device in this application may further include a power supply 43, a communication bus 44, and a communication port 45. The communication bus 44 is configured to implement communication connection between components. The communication port 45 is configured to implement a connection and communication between the network device and another peripheral.

In this embodiment of this application, the memory 42 is configured to store computer executable program code. The program code includes instructions. When the processor 41 executes the instructions, the network device is enabled to perform the actions of the network device in the foregoing method embodiment. An implementation principle and a technical effect of this embodiment are similar to those of the foregoing method embodiment. Details are not described herein again.

The processing module (or the processor), the storage module (or the memory), and the sending/receiving module (the transceiver) in the device in each of FIG. 11 to FIG. 14 in the embodiments of this application communicate with each other and transmit a control signal and/or a data signal by using an internal connection path. The foregoing method embodiment of this application may be applied to a processor, or the steps in the foregoing method embodiment are implemented by a processor. The processor may be an integrated circuit chip and has a signal processing capability. In an implementation process, steps in the foregoing method embodiment may be completed by using a hardware integrated logical circuit in the processor or by using instructions in a form of software. The processor may be a central processing unit (CPU), a network processor (NP), a combination of the CPU and the NP, a digital signal processor (DSP), an application specific integrated circuit (ASIC), a field programmable gate array (FPGA) or another programmable logic device, a discrete gate or a transistor logic device, or a discrete hardware component. The methods, the steps, and logical block diagrams that are disclosed in this application may be implemented or executed. The general-purpose processor may be a microprocessor, or the processor may be any conventional processor or the like. Steps of the methods disclosed with reference to this application may be directly performed and completed by using a hardware decoding processor, or may be performed and completed by using a combination of hardware and software modules in the decoding processor. The software module may be located in a mature storage medium in the art, such as a random-access memory, a flash memory, a read-only memory, a programmable read-only memory, an electrically erasable programmable memory, or a register. The storage medium is located in the memory, and the processor reads information in the memory and completes the steps in the foregoing methods in combination with hardware in the processor. Although only one processor is shown in the figure, the device may include a plurality of processors, or the processor includes a plurality of processing modules. Specifically, the processor may be a single-core processor, or may be a multi-core processor.

The memory is configured to store computer instructions executed by the processor. The memory may be a storage circuit, or may be a memory. The memory may be a volatile memory or a nonvolatile memory, or may include the volatile memory and the nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random-access memory (RAM) that is used as an external cache. The memory may be independent of the processor, or may be a storage module in the processor. This is not limited herein. Although only one memory is shown in the figure, the device may alternatively include a plurality of memories, or the memory includes a plurality of storage modules.

The transceiver is configured to implement content interaction between the processor and another module or network element. Specifically, the transceiver may be a communication interface of the device, may be a transceiver circuit or a communication module, or may be a transceiver. The transceiver may be alternatively a communication interface or a transceiver circuit of the processor. Optionally, the transceiver may be a transceiver chip. The transceiver may alternatively include a sending module and/or a receiving module. In a possible implementation, the transceiver may include at least one communication interface. In another possible implementation, the transceiver may alternatively be a module implemented in a form of software. In the embodiments of this application, the processor may interact with another module or network element by using the transceiver. For example, the processor obtains or receives content from another network element by using the transceiver. If the processor and the transceiver are two physically separated components, the processor may exchange content with another module of the device without using the transceiver.

In a possible implementation, the processor, the memory, and the transceiver may be connected to each other by using the bus. The bus may be a peripheral component interconnect (PCI) bus, an extended industry standard architecture (EISA) bus, or the like. The bus may be classified into an address bus, a data bus, a control bus, and the like.

In the embodiments of this application, words such as "example" or "for example" are used to represent giving an example, an illustration, or a description. Any embodiment or design scheme described as "example" or "for example" in the embodiments of this application should not be explained as being more preferred or having more advantages than another embodiment or design scheme. Exactly, use of the word such as "example" or "for example" is intended to present a relative concept in a specific manner.

In the embodiments of this application, for ease of understanding, a plurality of examples are used for description.

However, these examples are merely examples. It does not mean that these examples are best implementations for implementing this application.

In the embodiments of this application, for ease of description, names of a request message, a response message, and various other messages are used. However, these messages are merely used as an example to describe content that needs to be carried or an implemented function. A specific name of a message constitutes no limitation to this application. For example, the messages may be a first message, a second message, and a third message. These messages may be specific messages, or may be some fields in the messages. These messages may also represent various service operations.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid-state drive Solid-State Drive (SSD)), or the like.

The term "a plurality of" in this specification refers to two or more than two. The term "and/or" in this specification describes only an association relationship between associated objects and represents that three relationships may exist. For example, A and/or B may represent the following three cases: Only A exists, both A and B exist, and only B exists. In addition, the character "/" in this specification usually indicates an "or" relationship between the associated objects. In a formula, the character "/" indicates a "division" relationship between associated objects.

It may be understood that numerals in the embodiments of this application are used for differentiation merely for ease of description, but are not used to limit the scope of the embodiments of this application.

It may be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

What is claimed is:

1. A data transmission method, comprising:

obtaining, by a terminal device, a first resource and a second resource, wherein the first resource and the second resource are preset or are configured by a network device, wherein at least one first uplink transmission opportunity is configured for the first resource, a second uplink transmission opportunity is configured for the second resource, the first uplink transmission opportunity comprises X repeated first uplink transmission resources separated in a time domain at a first periodicity, and the second uplink transmission opportunity comprises Y repeated second uplink transmission resources separated in the time domain at a second periodicity, wherein each second uplink transmission resource is disposed between first uplink transmission resources, and wherein both X and Y are each integers greater than or equal to 1; and sending, by the terminal device, uplink data to the network device using the second uplink transmission opportunity in response to sending using N closest first uplink transmission opportunities before the second uplink transmission opportunity being blocked, wherein the N closest first uplink transmission opportunities being blocked comprises transmission on the N closest first uplink transmission opportunities conflicting with a higher layer configuration of a cell in which the terminal device is located, and wherein N is an integer greater than or equal to 1 and is less than or equal to X.

2. The method according to claim 1, wherein the sending using N closest first uplink transmission opportunities before the second uplink transmission opportunity being blocked comprises at least one of:

sending, on each of the X repeated first uplink transmission resources, in the first uplink transmission opportunity, being blocked; or a quantity of first uplink transmission resources on which sending is blocked and that are in the first uplink transmission opportunity being greater than or equal to a first preset threshold, wherein X is greater than 1, and wherein the first preset threshold is less than or equal to X.

3. The method according to claim 2, wherein the sending using N closest first uplink transmission opportunities before the second uplink transmission opportunity being blocked comprises sending on each of the X repeated first uplink transmission resources in the first uplink transmission opportunity being blocked, and wherein sending on each of the X repeated first uplink transmission resources in the first uplink transmission opportunity being blocked comprises at least one of:

at least one symbol in the first uplink transmission resource is a non-uplink symbol; or the terminal device sends the uplink data using at least one non-uplink symbol in the first uplink transmission resource; and wherein the at least one symbol is configured as a downlink symbol or a flexible symbol.

4. The method according to claim 2, wherein:

the first preset threshold is determined based on at least one of a first configuration parameter or a second configuration parameter of the first resource, wherein the first configuration parameter is associated with configuring X, and wherein the second configuration parameter is associated with configuring redundancy versions of uplink data allowed to be transmitted on the first uplink transmission resources in the first uplink transmission opportunity; or the method further comprises receiving, by the terminal device, first indication information from the network device, wherein the first indication information indicates the first preset threshold.

5. The method according to claim 1, further comprising:
receiving, by the terminal device, second indication information from the network device, wherein the second indication information indicates N.

6. The method according to claim 1, wherein
a second uplink transmission opportunity after one of the at least one first uplink transmission opportunity and the first uplink transmission opportunity are neighboring in the time domain; or
a second uplink transmission opportunity after one of the at least one first uplink transmission opportunity and the first uplink transmission opportunity are neighboring in the time domain, and have a same frequency domain position; and
wherein the second uplink transmission opportunity after one of the at least one first uplink transmission opportunity and the first uplink transmission opportunity being neighboring in the time domain comprises the second uplink transmission opportunity after one of the at least one first uplink transmission opportunity and the first uplink transmission opportunity being immediately adjacent in the time domain.

7. The method according to claim 1, further comprising:
determining, by the terminal device, in response to use of at least one of the N closest first uplink transmission opportunities before the second uplink transmission opportunity being unblocked, that the second uplink transmission opportunity cannot be used to send the uplink data, wherein the use of at least one of the N closest first uplink transmission opportunities being unblocked comprises transmission on the N closest first uplink transmission opportunities not conflicting with the higher layer configuration of the cell in which the terminal device is located.

8. An apparatus, comprising:
at least one processor; and
at least one non-transitory memory connected to the processor and storing a program for execution by the at least one processor, the program including instructions for:
obtaining a first resource and a second resource, wherein the first resource and the second resource are preset or are configured by a network device, wherein at least one first uplink transmission opportunity is configured for the first resource, a second uplink transmission opportunity is configured for the second resource, the first uplink transmission opportunity comprises X repeated first uplink transmission resources separated in a time domain at a first periodicity, and the second uplink transmission opportunity comprises Y repeated second uplink transmission resources separated in the time domain at a second periodicity, wherein each second uplink transmission resource is disposed between first uplink transmission resources, and wherein both X and Y are integers greater than or equal to 1; and
sending uplink data to the network device by using the second uplink transmission opportunity in response to sending using N closest first uplink transmission opportunities before the second uplink transmission opportunity being blocked, wherein the N closest first uplink transmission opportunities being blocked comprises transmission on the N closest first uplink transmission opportunities conflicting with a higher layer configuration of a cell in which the apparatus is located, and wherein N is an integer greater than or equal to 1 and is less than or equal to X.

9. The apparatus according to claim 8, wherein the sending using N closest first uplink transmission opportunities before the second uplink transmission opportunity being blocked comprises at least one of:
sending on each of the X repeated first uplink transmission resources in the first uplink transmission opportunity being blocked; or
a quantity of first uplink transmission resources on which sending is blocked and that are in the first uplink transmission opportunity being greater than or equal to a first preset threshold, wherein X is greater than 1, and wherein the first preset threshold is less than or equal to X.

10. The apparatus according to claim 9, wherein the sending using N closest first uplink transmission opportunities before the second uplink transmission opportunity being blocked comprises sending on each of the X repeated first uplink transmission resources in the first uplink transmission opportunity being blocked, and wherein sending on each of the X repeated first uplink transmission resources in the first uplink transmission opportunity being blocked comprises at least one of:
at least one symbol in the first uplink transmission resource is a non-uplink symbol; or
the apparatus sends the uplink data using at least one non-uplink symbol in the first uplink transmission resource; and
wherein the at least one symbol is configured as a downlink symbol or a flexible symbol.

11. The apparatus according to claim 9, wherein:
the first preset threshold is determined based on at least one of a first configuration parameter or a second configuration parameter of the first resource, wherein the first configuration parameter is associated with configuring X, and the second configuration parameter is associated with configuring redundancy versions of uplink data allowed to be transmitted on the first uplink transmission resources in the first uplink transmission opportunity; or
the program further includes instructions for:
receiving first indication information from the network device, wherein the first indication information indicates the first preset threshold.

12. The apparatus according to claim 8, wherein the program further includes instructions for:
receiving second indication information from the network device, wherein the second indication information indicates N.

13. The apparatus according to claim 8, wherein
a second uplink transmission opportunity after one of the at least one first uplink transmission opportunity and the first uplink transmission opportunity are neighboring in the time domain; or
a second uplink transmission opportunity after one of the at least one first uplink transmission opportunity and the first uplink transmission opportunity are neighboring in the time domain, and have a same frequency domain position; and
wherein the second uplink transmission opportunity after one of the at least one first uplink transmission opportunity and the first uplink transmission opportunity being neighboring in the time domain comprises the second uplink transmission opportunity after one of the at least one first uplink transmission opportunity and the first uplink transmission opportunity being immediately adjacent in the time domain.

14. The apparatus according to claim 8, wherein the program further includes instructions for:

determining, in response to use at least one of the N closest first uplink transmission opportunities before the second uplink transmission opportunity being unblocked, that the second uplink transmission opportunity cannot be used to send the uplink data, wherein the use of at least one of the N closest first uplink transmission opportunities being unblocked comprises transmission on the N closest first uplink transmission opportunities not conflicting with the higher layer configuration of the cell in which the apparatus is located.

15. An apparatus, comprising:

at least one processor; and at least one non-transitory memory storing a program for execution instructions; wherein the instructions are executed by the at least one processor, the program having instructions for:

obtaining a first resource and a second resource that are each configured for a terminal device, wherein the first resource and the second resource are preset or are configured by the apparatus, wherein at least one first uplink transmission opportunity is configured for the first resource, a second uplink transmission opportunity is configured for the second resource, the first uplink transmission opportunity comprises X repeated first uplink transmission resources separated in a time domain at a first periodicity, and the second uplink transmission opportunity comprises Y repeated second uplink transmission resources separated in the time domain at a second periodicity, wherein each second uplink transmission resource is disposed between first uplink transmission resources, and wherein both X and Y are integers greater than or equal to 1; and monitoring on the second uplink transmission opportunity, uplink data from the terminal device in response to sending using N closest first uplink transmission opportunities before the second uplink transmission opportunity being blocked, wherein the N closest first uplink transmission opportunities being blocked comprises transmission on the N closest first uplink transmission opportunities conflicting with a higher layer configuration of a cell in which the terminal device is located, wherein N is an integer greater than or equal to 1 and is less than or equal to X.

16. The apparatus according to claim 15, wherein sending using N closest first uplink transmission opportunities before the second uplink transmission opportunity being blocked comprises at least one of:

sending on each of the X repeated first uplink transmission resources in the first uplink transmission opportunity being blocked; or a quantity of first uplink transmission resources on which sending is blocked and that are in the first uplink transmission opportunity being greater than or equal to a first preset threshold, wherein X is greater than 1, and wherein the first preset threshold is less than or equal to X.

17. The apparatus according to claim 16, wherein sending on the N closest first uplink transmission opportunities before the second uplink transmission opportunity being blocked comprises sending on each of the X repeated first uplink transmission resources in the first uplink transmission opportunity being blocked, and wherein sending on each of the X repeated first uplink transmission resources in the first uplink transmission opportunity being blocked comprises:

at least one symbol in the first uplink transmission resource being a non-uplink symbol; or the terminal device sends the uplink data using at least one non-uplink symbol in the first uplink transmission resource; and wherein the at least one symbol is configured as a downlink symbol or a flexible symbol.

18. The apparatus according to claim 16, wherein:

the first preset threshold is determined based on at least one of a first configuration parameter or a second configuration parameter of the first resource, wherein the first configuration parameter is associated with configuring X, and the second configuration parameter is associated with configuring redundancy versions of uplink data allowed to be transmitted on the first uplink transmission resources in the first uplink transmission opportunity; or the program further includes instructions for:

sending first indication information to the terminal device, wherein the first indication information indicates the first preset threshold.

19. The apparatus according to claim 15, wherein the program further includes instructions for:

sending second indication information to the terminal device, wherein the second indication information indicates N.

20. The apparatus according to claim 15, wherein:

a second uplink transmission opportunity after one of the at least one first uplink transmission opportunity and the first uplink transmission opportunity are neighboring in the time domain; or a second uplink transmission opportunity after one of the at least one first uplink transmission opportunity and the first uplink transmission opportunity are neighboring in the time domain, and have a same frequency domain position; and wherein the second uplink transmission opportunity after one of the at least one first uplink transmission opportunity and the first uplink transmission opportunity being neighboring in the time domain comprises the second uplink transmission opportunity after one of the at least one first uplink transmission opportunity and the first uplink transmission opportunity being immediately adjacent in the time domain.

* * * * *